(12) United States Patent
Sponsler

(10) Patent No.: US 12,143,062 B2
(45) Date of Patent: Nov. 12, 2024

(54) APPARATUS AND METHOD FOR SOLAR ENERGY COLLECTOR

(71) Applicant: Joseph Sponsler, Portland, OR (US)

(72) Inventor: Joseph Sponsler, Portland, OR (US)

( * ) Notice: Subject to any disclaimer, the term of this patent is extended or adjusted under 35 U.S.C. 154(b) by 0 days.

(21) Appl. No.: 18/108,229

(22) Filed: Feb. 10, 2023

(65) Prior Publication Data

US 2023/0283229 A1    Sep. 7, 2023

Related U.S. Application Data

(60) Provisional application No. 63/316,687, filed on Mar. 4, 2022.

(51) Int. Cl.
*H02S 30/20*    (2014.01)
*H02S 10/40*    (2014.01)

(52) U.S. Cl.
CPC .............. *H02S 30/20* (2014.12); *H02S 10/40* (2014.12)

(58) Field of Classification Search
CPC ................................ H02S 30/20; H02S 30/40
USPC ........................................................ 52/173.3
See application file for complete search history.

(56) References Cited

U.S. PATENT DOCUMENTS

| | | | | |
|---|---|---|---|---|
| 4,957,185 A * | 9/1990 | Courchesne | ............ | E04G 5/041 248/237 |
| 4,995,377 A * | 2/1991 | Eiden | ...................... | F24S 30/48 353/3 |
| 5,125,608 A * | 6/1992 | McMaster | ............... | F24S 25/12 248/676 |
| 5,191,875 A * | 3/1993 | Edling | ................... | F24S 30/452 126/576 |
| 5,228,924 A * | 7/1993 | Barker | ..................... | H02S 20/30 136/246 |
| 5,249,397 A * | 10/1993 | Monaco | ................... | E04G 3/265 52/126.1 |
| 6,745,869 B2 * | 6/2004 | Garrett | .................... | E04D 15/00 182/45 |
| 7,858,875 B2 * | 12/2010 | Lu | .......................... | F24S 30/40 136/246 |
| 8,459,249 B2 * | 6/2013 | Corio | .................... | F24S 30/425 126/606 |
| 8,939,872 B2 * | 1/2015 | Sprague | ........... | A63B 21/00047 482/79 |
| D739,819 S * | 9/2015 | Hannum | ...................... | D13/110 |
| 9,281,778 B2 * | 3/2016 | Corio | .................... | F24S 25/636 |
| 9,444,395 B2 * | 9/2016 | Tung | ....................... | F24S 25/65 |
| 10,222,446 B2 * | 3/2019 | Au | .......................... | F16H 19/08 |
| 10,367,446 B2 * | 7/2019 | Tanaka | .................... | F24S 25/70 |

(Continued)

*Primary Examiner* — James J Buckle, Jr.
(74) *Attorney, Agent, or Firm* — Mohr Intellectual Property Law Solutions, PC

(57) ABSTRACT

A system and method for a portable solar cell array system is provided. One embodiment has a first, second and third plurality of solar cell panels, a support structure, a lower assembly slidably coupled to the support structure, a center assembly secured to the support structure, wherein the center assembly is secured to the support structure, and an upper assembly slidably coupled to the support structure. When in a closed configuration, the first, second and third plurality of solar cell are stacked above each other and are within the support structure. When in an open configuration, the first, second and third plurality of solar cell panels are aligned in an upward orientation in a first row, second row, and third row to collect solar radiation.

19 Claims, 14 Drawing Sheets

(56) References Cited

U.S. PATENT DOCUMENTS

| | | | |
|---|---|---|---|
| 10,622,938 B2 * | 4/2020 | Boguess | H02S 20/30 |
| 10,670,303 B2 * | 6/2020 | West | F24S 25/65 |
| 2008/0105489 A1 * | 5/2008 | Garrett | E04G 3/26 |
| | | | 248/237 |
| 2009/0120016 A1 * | 5/2009 | Hon | H02S 20/00 |
| | | | 52/173.3 |
| 2010/0024317 A1 * | 2/2010 | Pope | E04B 1/3431 |
| | | | 52/173.3 |
| 2010/0175741 A1 * | 7/2010 | Thorne | H02S 20/32 |
| | | | 136/251 |
| 2011/0024582 A1 * | 2/2011 | Gies | H02S 20/10 |
| | | | 248/122.1 |
| 2011/0132353 A1 * | 6/2011 | Gumm | H02S 20/30 |
| | | | 29/890.033 |

* cited by examiner

APPARATUS AND METHOD FOR SOLAR ENERGY COLLECTOR

PRIORITY CLAIM

This application claims priority to U.S. Provisional Application, Ser. No. 63/316,687, filed on Mar. 4, 2022, entitled Apparatus and Method For Solar Energy Collector, which is hereby incorporated by reference in its entirety for all purposes.

BACKGROUND OF THE INVENTION

Photovoltaic cells, commonly referred to as solar cells, are used to convert sunlight into electrical energy. Typically, one solar cell, or an array of solar cells, are located on a fixed structure, such as on the ground, or on a vehicle or vessel.

Portable solar cells have also been developed. However, electric output and capacity is limited by the area of the solar cell that can be exposed to sunlight, the weight of a solar cell system, the need for a support structure to secure the solar cell system. That is, there has been a limiting size (area of the photovoltaic solar cells) of a portable solar cell system that can be easily transported, set up, and used for generation of electricity.

Accordingly, in the arts of solar cell power generation, there is a need in the arts for improved methods, apparatus, and systems for a larger scale, portable solar cell generator system.

SUMMARY OF THE INVENTION

A system and method for a portable solar cell array system is provided. One embodiment has a first, second and third plurality of solar cell panels, a ground support structure, a lower assembly slidably coupled to the ground support structure, a center assembly secured to the support structure, wherein the center assembly is secured to the ground support structure, and an upper assembly slidably coupled to the ground support structure. When in a closed configuration, the first, second and third plurality of solar cell are stacked above each other and are within the ground support structure. When in an open configuration, the first, second and third plurality of solar cell panels are aligned in an upward orientation in a first row, second row, and third row to collect solar radiation.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
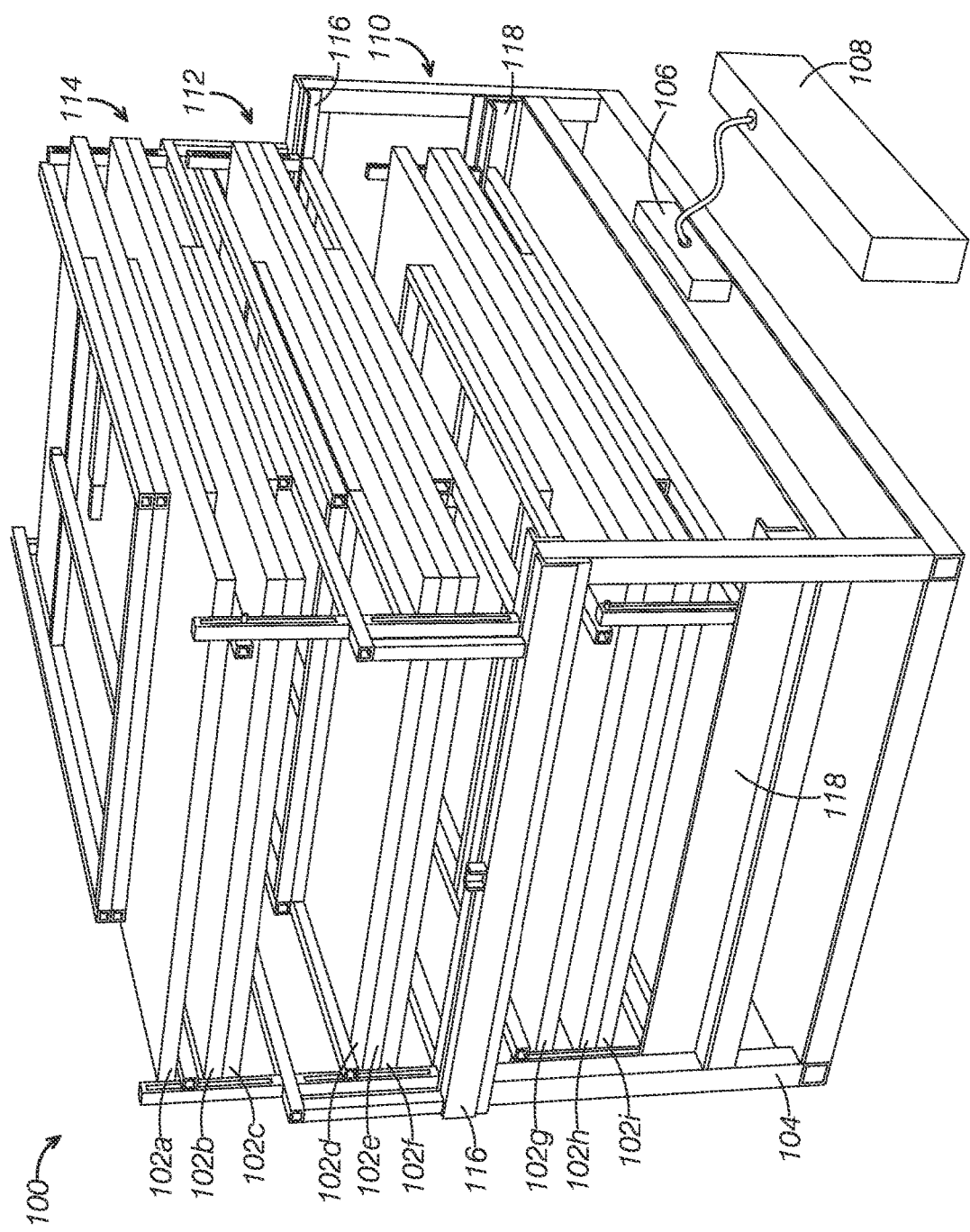
FIG. 1 is a diagram of a nonlimiting example embodiment of a portable solar cell array in a closed configuration.
Figure 2:
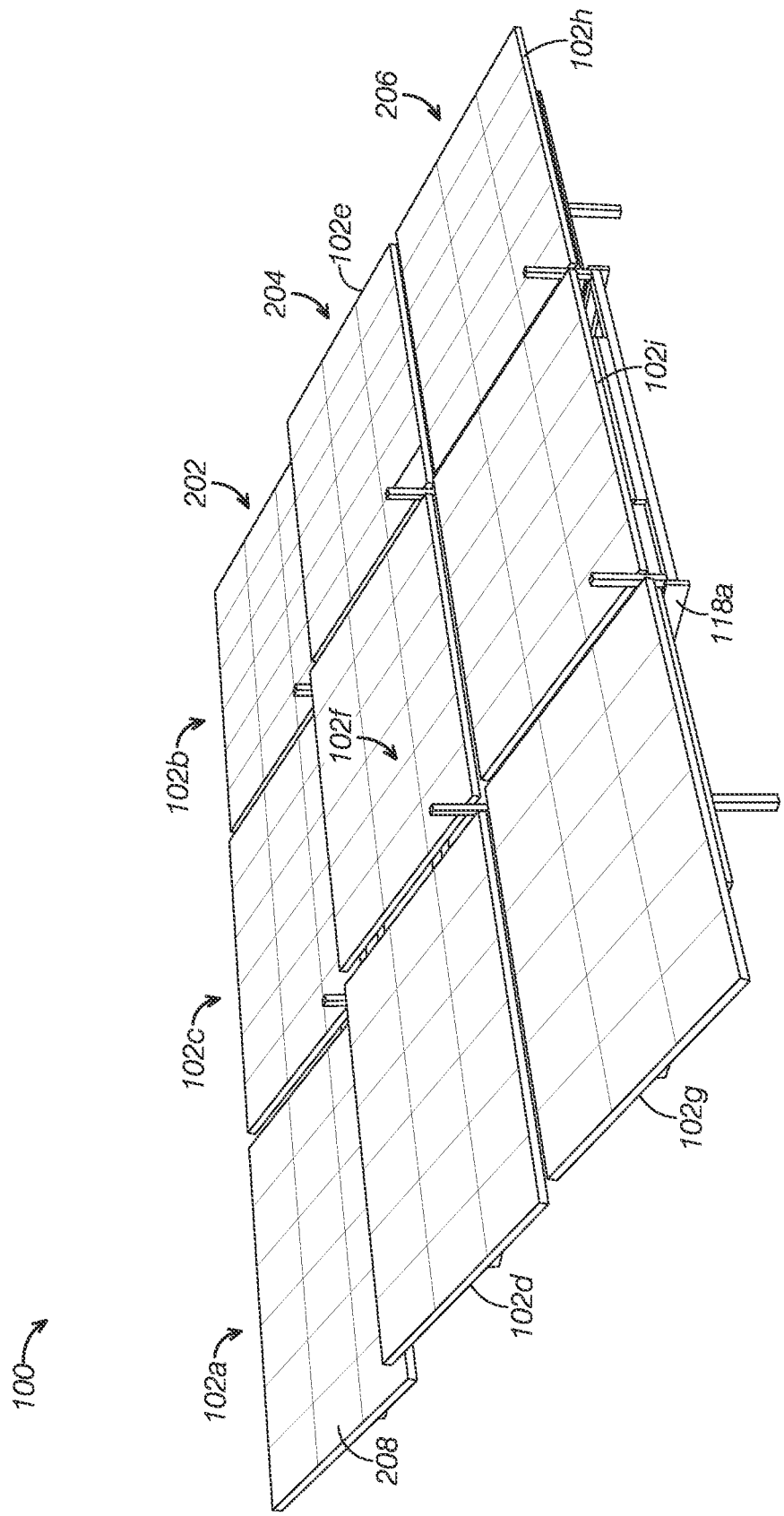
FIG. 2 is a diagram of an open configuration of the portable solar cell array.

FIG. 1 is a diagram of a nonlimiting example embodiment of a portable solar cell array 100 in a closed configuration, interchangeably referred to herein as a folded up configuration. FIG. 2 is a diagram of an open configuration of the portable solar cell array 100.

Preferred embodiments of the portable solar cell array 100 comprise nine solar cell panels 102a-102i (generically referred herein using reference numeral 102), a ground support structure 104, an optional power conditioning unit 106, and an optional energy storage system 108. The ground support structure 104 supports a lower assembly 110 with three solar cell panels 102g-i, a center assembly 112 with three solar cell panels 102d-f, and an upper assembly 114 with three solar cell panels 102a-c. In some embodiments, wheels or rollers may be secured to the bottom of the support structure 104 to facilitate movement of the portable solar cell array 100. Optionally, ground support members (legs) secured to the support structure 104 may be used to stabilize the portable solar cell array 100 when in the open configuration.

When the portable solar cell array 100 is in the closed configuration, the nine solar panels 102a-102i are oriented in a stacked configuration. In alternative embodiments, more than nine solar cell panels 102, or less than nine solar cell panels 102, may be used in the portable solar cell array 100.

When in the closed configuration, the bottom surface area of the portable solar cell array 100 substantially corresponds to the surface area of a single solar cell panel 102. Accordingly, the portable solar cell array 100 occupies a relatively small footprint space when in the closed configuration. Furthermore, the support structure 104 secures the solar cell panels 102a-102i in a safe protective manner since the solar cell panels 102 are withing the interior space of the support structure 104.

Also, when in the closed configuration, the solar cell panels 102a-b are facing in a downward direction and are oriented over the solar cell panel 102c so as not to be exposed to potential damage that might be caused by inadvertent contact with an object. The solar cell panels 102d-i are similarly configured.

In the various embodiments, the support structure 104, the lower assembly 110, the center assembly 112, and the upper assembly 114 are preferably made from a rigid, light weight durable material, such as a metal, a plastic, composite, or the like. Because of the relatively lightweight, small compact size of the portable solar cell array 100 when in the closed configuration, the portable solar cell array 100 may be easily and safely moved to a location of use. For example, the portable solar cell array 100 may be fabricated at a manufacturing facility, and then transported to a remote rural location for use. Preferably, the relatively light weight portable solar cell array 100 may be easily moved by one or more individuals, and/or moved by a mechanical device such as a forklift, crane, lift, rollers, wheels or the like.

As illustrated in FIG. 2, when the portable solar cell array 100 is in the open configuration, the first plurality of solar cell panels 102a-c are aligned in an upward and an optional tilted orientation in a first row 202 to collect solar radiation, the second plurality of solar cell panels 102d-f are aligned in the upward and an optional tilted orientation in a second row 204 to collect the solar radiation, and the third plurality of solar cell panels 102g-i are aligned in the upward and an optional tilted orientation in a third row 206 to collect the solar radiation. Preferably, the portable solar cell array 100 is aligned along the sun's azimuth so that the plurality of solar cell panels 102 are aligned with and directed towards the sun to collect the solar radiation. Each solar cell panel 102 may employ a tilt support member (see FIG. 3) to adjust the tilt angle of the solar cell panels. Preferably, the tilt support members are adjustable, and may allow a tilt angle of between zero degrees and sixty degrees, though any tilt angle range may be designed.

Each of the solar cell panels 102a-102i are comprised of one or more individual solar cells 208 that are electrically coupled together. In the example embodiment illustrated in FIG. 2, each of the solar cell panels 102a-102i are comprised of eighteen individual solar cells 208. In other embodiments, any suitable number of individual solar cells 208 may be used and arranged in any suitable configuration. Each of the individual solar cells 208 are fabricated on, or secured to, a rigid, light weight durable substrate material. Preferably, the sunlight receiving surfaces of the solar cells are covered with a transparent, weather and damage resistant covering.

The disclosed systems and methods for the portable solar cell array 100 will become better understood through review of the following detailed description in conjunction with the figures. The detailed description and figures provide examples of the various inventions described herein. Those skilled in the art will understand that the disclosed examples may be varied, modified, and altered without departing from the scope of the inventions described herein. Many variations are contemplated for different applications and design considerations, however, for the sake of brevity, each and every contemplated variation is not individually described in the following detailed description.

Throughout the following detailed description, a variety of examples for systems and methods for the portable solar cell array 100 are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components. "Secured to" means directly connected without intervening components.

"Communicatively coupled" means that an electronic device exchanges information with another electronic device, either wirelessly or with a wire based connector, whether directly or indirectly. "Controllably coupled" means that an electronic device controls operation of another electronic device. "Electrically coupled" means that one or more conductors of at least two electronic devices (e.g., the solar cell panels 102a-102i, the power conditioning unit 106, and/or the energy storage system 108) are electrically connected to transmit electricity (electrical power).

Returning to FIG. 1, upper assembly 114 is secured to the support structure 104 using a suitable slider system 116. The slider system 116 allows the installer to slide the lower assembly 110 in a backward direction out from the support structure 104 beyond the rear of the lower assembly 110. The upper assembly 114 is slid outward to an extent that enables the installer to fold open, in a rotational manner, the solar panels 102a and 102b so that the solar panels 102a-102c can be arranged in the upper row 202 (FIG. 2). Further, the installer can fold open the solar panels 102d and 102e without engaging the front of the upper assembly 114.

The lower assembly 110 is secured to the support structure 104 using a suitable slider system 118. The slider system 118 allows the installer to slide the lower assembly 110 in a forward direction out from the support structure 104 and beyond the front of the lower assembly 110. The lower assembly 110 is slid outward to an extent that enables the installer to fold open the solar panels 102g and 102h, in a rotational manner, so that the solar panels 102g-102i can be arranged in the lower row 206 (FIG. 2) without engaging the front of the support structure 104.

In the various embodiments, optionally, the solar panels 102a-102i are electrically coupled to the optional power conditioning unit 106 via suitable conductors. The conductors are durable flexible connecting wires that allow the portable solar cell array 100 to be opened and closed as needed. The conductors (not shown) may be located inside of the various members of the support structure 104, the lower assembly 110, the center assembly 112, and/or the upper assembly 114. Alternatively, or additionally, the conductors may be secured to the support structure 104, the lower assembly 110, the center assembly 112, and/or the upper assembly 114 using a suitable fastening means, such as, but not limited to, plastic or wire ties, zip ties, retaining clips, string, and/or clamps. Electrically coupling the various component prior to transportation of the portable solar cell array 100 to the use site simplifies installation and operation of the portable solar cell array 100 at the use site, particularly if the installers are not technicians familiar with installation of solar cell power systems.

The optional power conditioning unit 106 conditions the electrical power received from the solar panels 102a-102i. In some embodiments, the voltage of the received power generated by the solar cells 208 is converted to another predefined voltage, such as a voltage of the energy storage system 108 or a voltage used by other devices, such as electric lights, tools, communication devices, or the like. Alternatively, or additionally, the current received from the solar panels 102a-102i may be changed from direct current (DC) to alternating current (AC) by the power conditioning unit 106. In some embodiments, the power conditioning unit 106 is secured to the support structure 104 at a desired location. Alternatively, the power conditioning unit 106 may be removable and/or portable so as to reduce the total weight of the portable solar cell array 100. In such embodiments, a suitable plug or receptacle may be disposed on the support structure 104 to enable electrical coupling of the solar cell panels 102 to the power conditioning unit 106, or coupling the solar cell panels 102 to another electrical device that utilizes the electrical power generated by the solar panels 102.

In some embodiments, the optional energy storage system 108 may be electrically coupled to the power conditioning unit 106 and/or to the solar cell panels 102. The energy storage system 108 stores power received from the portable solar cell array 100 for later use by another electrical device. In some embodiments, the energy storage system 108 may be secured to the support structure 104 at a desired location. Alternatively, the energy storage system 108 may be removable and/or portable to reduce the total weight of the portable solar cell array 100. Non limiting examples of the energy storage system 108 may be a rechargeable battery, capacitors, or the like.

Figure 3:
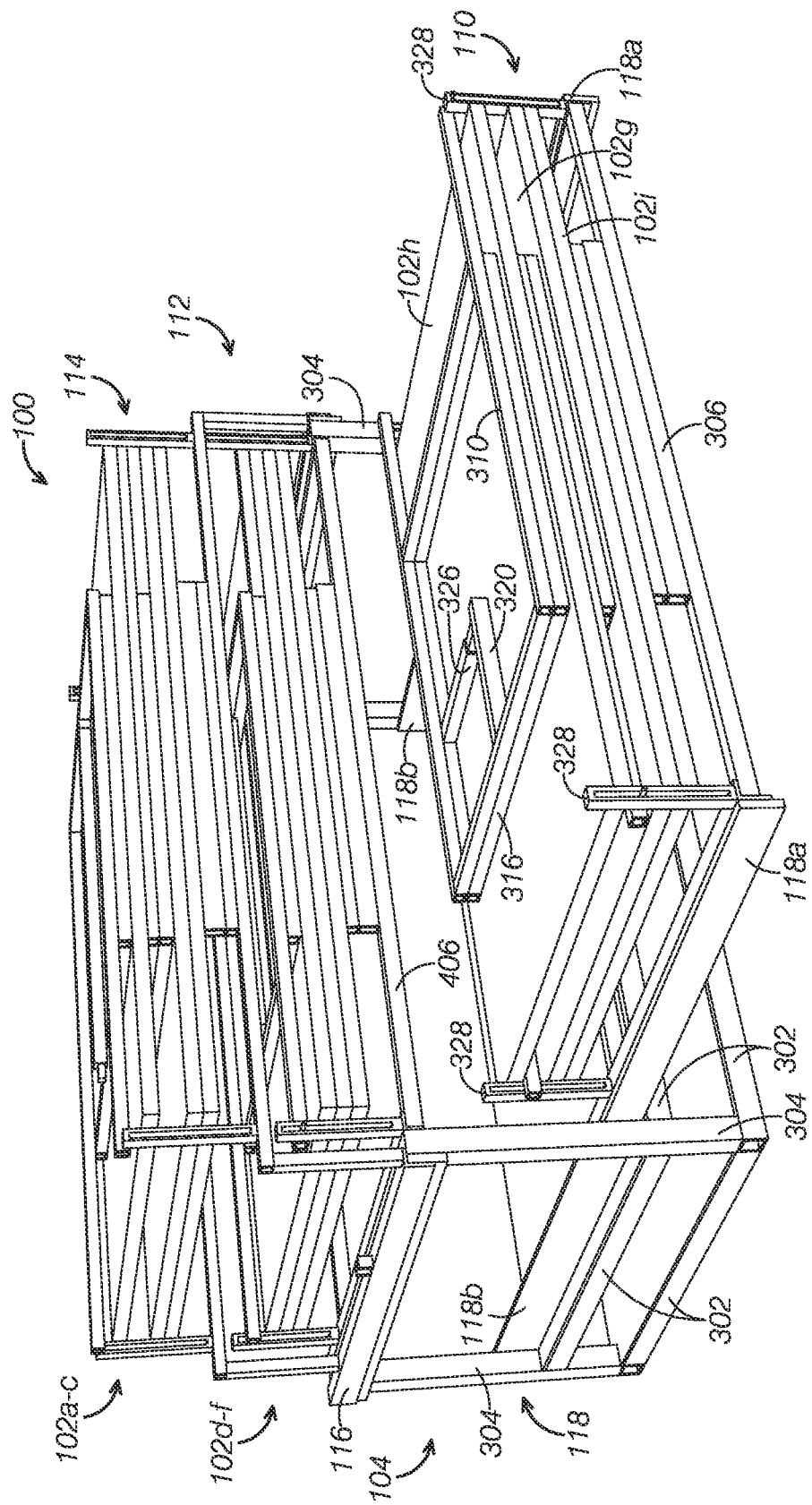
FIG. 3 is a diagram of the portable solar cell array after the lower assembly 110 has been slid outwardly to its extended position.

FIG. 3 is a diagram of the portable solar cell array 100 after the lower assembly 110 has been slid outwardly to its extended position (interchangeably referred to herein as the outwardly extended configuration) for the support structure 104. In an example embodiment, the support structure 104 comprises a plurality of horizontally oriented support members 302 and vertically oriented support members 34 that are secured together at their ends. The lowest members 302 form the base of the support structure 104. In the example embodiment, the support members 302, 304 cooperatively define a rigid support structure 104 that securely and safely holds the solar panels 102a-102i and their associated components when the portable solar cell array 100 in in the closed configuration and the open configuration, and during intermediate configurations (such as the configuration illustrated in FIG. 3).

In the example embodiment, the support members 302, 304 are made of a tubular rigid metal with the ends of the members 302, 304 welded together during fabrication of the portable solar cell array 100. Alternatively, or additionally, other fastening means such as screws, braces, tabs, bolts, detents or the like may be used in the various embodiments to secure the members 302, 304 together.

In a preferred embodiment, hollow tubing is used for one or more of the members 302, 304 (and other components of the portable solar cell array 100) to increase structural strength while minimizing overall weight of the support structure 104. Other embodiments may employ other materials and/or structure for the portable solar cell array 100 without departing from the scope of this disclosure. For example, portions of the support structure 104 may be fabricated as a unibody structure. One or more selected members 302, 304 may be solid for increased strength.

Any number of support members 302, 304 may be used in the various embodiments. Some support members may have an angled orientation. Preferably, the support members are arranged in a fashion that encloses and protects the solar cell panels 102 when in the portable solar cell array 100 is in the closed configuration. Also, the support members 302, 304 are arranged in a fashion that supports the solar cell panels 102 when the portable solar cell array 100 is in the open configuration.

As illustrated in the example embodiment of FIG. 3, the lower assembly 110 is slidably secured to the support structure 104 by the slider system 118. The non-limiting example lower assembly 110 comprises a first lower assembly frame member 306. In this example embodiment, the lower assembly frame member 306 is a horizontally oriented planar member that is rigid with sufficient strength to support the solar cell panels 102g-102i and their associated support members when the portable solar cell array 100 is in the closed or open configurations.

In this example embodiment, the slider system 118 comprises two sliders, each having a first lower assembly slider member 118a secured to the first lower assembly frame member 306 and a second lower assembly slider member 118b secured to the support structure 104. Here, the first lower assembly slider member 118a is slidably engaged with the second lower assembly slider member 118b. The lower assembly 110 is initially slid in a forward direction (relative to the support structure 104) to an outwardly extended configuration from the support frame 104 using the cooperatively engaged first lower assembly slider members 118a, 118b.

Figure 4:
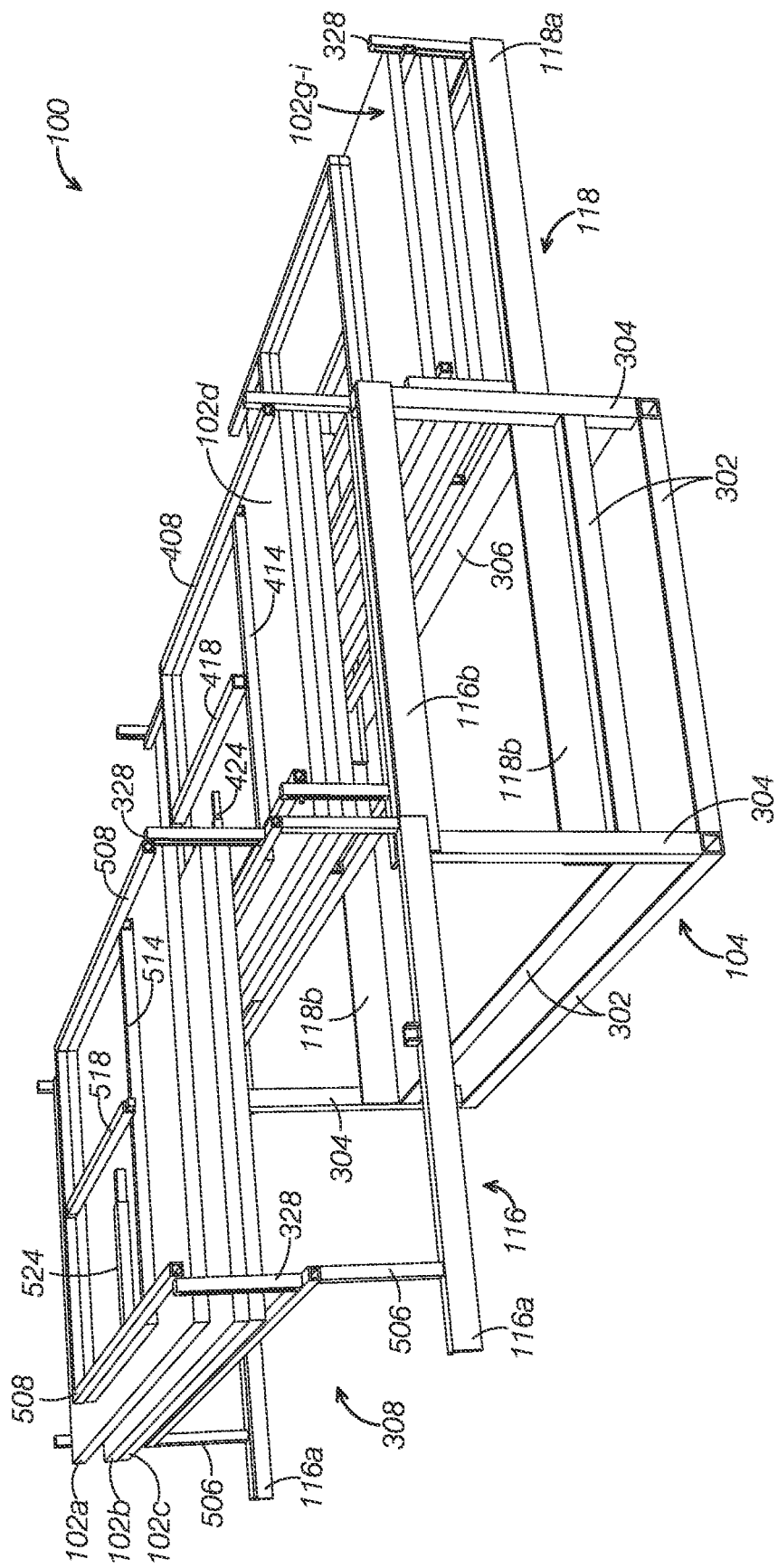
FIG. 4 is a diagram of the portable solar cell array after both the upper assembly and the lower assembly has been slid outwardly to their extended positions.

FIG. 4 is a diagram of the portable solar cell array 100 after both of the upper assembly 114 and the lower assembly 110 have been slid outwardly to their extended positions. The upper assembly 114 is slidably secured to the support structure 104 by the slider system 116. The non-limiting example upper assembly 114 comprises a first upper assembly frame member 308. In this example embodiment, the upper assembly frame member 308 is a horizontally oriented planar member that is rigid with sufficient strength to support the solar cell panels 102a-102c and their associated support members when the portable solar cell array 100 is in the closed or open configurations.

In this example embodiment, the slider system 116 comprises two sliders, each having a first upper assembly slider member 116a secured to the first upper assembly frame member 308 and a second upper assembly slider member 116b secured to the support structure 104. Here, the first upper assembly slider member 116a is slidably engaged with the second upper assembly slider member 116b. The upper assembly 110 is initially slid in a backwards direction (relative to the support structure 104) to an outwardly extended configuration from the support frame 104 using the cooperatively engaged first upper assembly slider member 116a and the second upper assembly slider member 116b.

In other embodiments, other suitable slider systems may be used so slide the lower assembly 110 into its forward extended position and to slide the upper assembly 114 into its backward extended position. For example, but not limited to, a telescoping arm may be used to slide the lower assembly 110 and the upper assembly 114. Alternatively, more than two slider members may be slidably engaged to slide the lower assembly 110 and the upper assembly 114.

After the lower assembly 110 and the upper assembly 114 have been slid to their extended positions, then the solar panels 102d-102e can be folded outwardly so that the solar cells on the three solar panels 102d-102f are facing upwardly. Accordingly, the travel length provided by the slider system 118 must be long enough so that the rear end end of the lower assembly 110 extends outwardly beyond the forward end of the center assembly 112. Similarly, the travel length provided by the slider system 116 must be long enough so that the forward end of the upper assembly 114 extends outwardly beyond the rear end of the center assembly 112.

After the lower assembly 110 has been slid outwardly, the solar cell panel 102g may be rotated outwardly so that the solar cells of the solar cell panel 102g are facing upward. Then, the solar cell panel solar cell panel 102h is rotated outwardly so that the solar cells of the solar cell panel 102h are facing upward. After the solar cell panels 102g and 102h have been rotated outwardly, the solar cell panel 102i becomes exposed (since it is upwardly oriented in the lower assembly 110).

FIGS. 4-8 illustrate various stages of folding open the solar cell panels 102. These figures illustrate in greater detail the various support members that facilitate opening the portable solar cell array 100 into the open configuration. For brevity, a brief description of each solar cell panel support member follows. Like reference numerals in the figures represent like or similar elements.

The solar cell panel support members of the lower assembly 110 include:

(1) A first lower assembly frame member 306. The first lower assembly frame member 306 is a horizontally oriented planar member that is rigid with sufficient strength to support the solar cell panels 102g-102i and their associated support members. The first lower assembly slider members 118a are secured to the first lower assembly frame member 306. Optionally, one or more ground support members (legs) secured to the first lower assembly frame member 306 may be used to stabilize the portable solar cell array 100 when in the open configuration.

(2) A second lower assembly frame member 308. The second lower assembly frame member 308 is a horizontally oriented planar member that is rigid with sufficient strength to support the solar cell panel 102g and its associated support members. A side of the second lower assembly frame member 308 is rotatably coupled to a corresponding side of the first lower assembly frame member 306.

(3) A third lower assembly frame member 310. The third lower assembly frame member 310 is a horizontally oriented planar member that is rigid with sufficient strength to support the solar cell panel 102h and its associated support members. A side of the third lower assembly frame member 310 is rotatably coupled to a corresponding opposing side of the first lower assembly frame member 306.

(4) A first lower assembly solar cell panel frame member 312. The first lower assembly solar cell panel frame member 312 is a rigid planar member that is secured to a bottom side (opposing the side that has the solar cells 208) of the solar cell panel 102i. A front side or edge of the first lower assembly solar cell panel frame member 312 is rotatably coupled to the front side or edge of the first lower assembly frame member 306.

(5) A second lower assembly solar cell panel frame member 314. The second lower assembly solar cell panel frame member 314 is a rigid planar member that is secured to a bottom side (opposing the side that has the solar cells 208) of the solar cell panel 102g. A front side or edge of the second lower assembly solar cell panel frame member 314 is rotatably coupled to the front side or edge of the second lower assembly frame member 308.

(6) A third lower assembly solar cell panel frame member 316. The third lower assembly solar cell panel frame member 316 is a rigid planar member that is secured to a bottom side (opposing the side that has the solar cells 208) of the solar cell panel 102h. A front side or edge of the third lower assembly solar cell panel frame member 316 is rotatably coupled to the front side of the third lower assembly frame member 310.

(7) An optional first floor support member (leg) 318. A proximal end of the first leg 318 is rotatably coupled to the second lower assembly frame member 308 and is configured to extend downwardly so that the distal end of the first leg 318 is supported by the ground when the portable solar cell array 100 is in the open configuration. When the portable solar cell array 100 is in the closed configuration, the first leg 318 rotatably folds within the second lower assembly frame member 308. Other embodiments may employ a plurality of legs 318.

(8) An optional second floor support member (leg) 320. A proximal end of the second leg 320 is rotatably coupled to the third lower assembly frame member 310 and is configured to extend downwardly so that the distal end of the second leg 320 is supported by the ground when the portable solar cell array 100 is in the open configuration. When the portable solar cell array 100 is in the closed configuration, the second leg 320 rotatably folds within the third lower assembly frame member 310. Other embodiments may employ a plurality of legs 320.

(9) A first tilt support member 322. In a preferred embodiment, a proximal end of the first tilt support member 322 is rotatably coupled to the rear side or edge of the first lower assembly solar cell panel frame member 312. When the portable solar cell array 100 is in the open configuration, the rear edge of the first lower assembly solar cell panel frame member 312 is rotated upwardly (tilted) so that the solar panel 102i is slanted upwardly to receive incident solar energy. The distal end of the first tilt support member 322 is then secured to proximate to the rear end of the first lower assembly frame member 306 to retain the solar panel 102i in the tilted orientation. When the portable solar cell array 100 is in the closed configuration, the first tilt support member 322 folds within the first lower assembly solar cell panel frame member 312. (In an alternative embodiment, the distal end of the first tilt support member 322 is rotatably coupled proximate to the rear end of the first lower assembly frame member 306 so that the proximal end of the first tilt support member 322 can be secured to the first lower assembly solar cell panel frame member 312 to retain the solar panel 102i in the tilted orientation.) Other embodiments may employ a plurality of first tilt support members 322.

(10) A second tilt support member 324. In a preferred embodiment, a proximal end of the second tilt support member 324 is rotatably coupled to the rear side or edge of the second lower assembly solar cell panel frame member 314. When the portable solar cell array 100 is in the open configuration, the rear edge of the second lower assembly solar cell panel frame member 314 is rotated upwardly (tilted) so that the solar panel 102g is slanted upwardly to receive incident solar energy. The distal end of the second tilt support member 324 is then secured to proximate to the rear end of the second lower assembly frame member 308 to retain the solar panel 102g in the tilted orientation. When the portable solar cell array 100 is in the closed configuration, the second tilt support member 324 folds within the second lower assembly solar cell panel frame member 314. (In an alternative embodiment, the distal end of the second tilt support member 324 is rotatably coupled proximate to the rear end of the second lower assembly frame member 308 so that the proximal end of the second tilt support member 324 can be secured to the second lower assembly solar cell panel frame member 314 to retain the solar panel 102g in the tilted orientation.) Other embodiments may employ a plurality of first tilt support members 324.

(11) A third tilt support member 326. In a preferred embodiment, a proximal end of the third tilt support member 326 is rotatably coupled to the rear side or edge of the third lower assembly solar cell panel frame member 316. When the portable solar cell array 100 is in the open configuration, the rear edge of the third lower assembly solar cell panel frame member 316 is rotated upwardly (tilted) so that the solar panel 102h is slanted upwardly to receive incident solar energy. The distal end of the third tilt support member 326 is then secured to proximate to the rear end of the third lower assembly frame member 310 to retain the solar panel 102h in the tilted orientation. When the portable solar cell array 100 is in the closed configuration, the third tilt support member 326 folds within the third lower assembly solar cell panel frame member 316. (In an alternative embodiment, the distal end of the third tilt support member 326 is rotatably coupled proximate to the rear end of the third lower assembly frame member 310 so that the proximal end of the third tilt support member 326 can be secured to the third lower assembly solar cell panel frame member 316 to retain the solar panel 102h in the tilted orientation.) Other embodiments may employ a plurality of first tilt support members 326.

Tilt support members, in a preferred embodiment, are adjustable to permit the installer to tilt the solar panels 102 at a desired tilt angle between zero degrees and sixty degrees. In some embodiments, the tilt support member may be a telescoping support member that provides for an adjustable length that can be selected to define the tilt angle.

In other embodiments the tilt support member may be a rigid member of a predefined length with a plurality of apertures disposed along the length of the member. A support bracket or the like that is secured towards the rear of the respective lower assembly frame member is configured to receive and retain the tilt support member. The tilt angle may be selected by inserting a pin or other retainer through a selected aperture of the bracket and the tilt support member.

(12) A first plurality of rotational post support members 328. A first one and a second one of the vertically oriented first plurality of rotational post support members 328 are secured to the first lower assembly frame member 306 on a side adjacent to the second lower assembly frame member 308. A third one and a fourth one of the vertically oriented first plurality of rotational post support members 328 are secured to the first lower assembly frame member 306 on an opposing side adjacent to the third lower assembly frame member 310. In the illustrated example embodiment, the first and third rotational post support members 328 are located proximate to the front end of the first lower assembly frame member 306. The second and fourth rotational post support members 328 are located proximate to the rear end of the first lower assembly frame member 306.

(13) The first and second rotational post support members 328 are defined by an aperture 330 that is configured to receive corresponding rotation pins 332 that are secured to the side of the second lower assembly frame member 308. The third and fourth rotational post support members 328 are also defined by an aperture 330 that is configured to receive corresponding rotation pins 332 that are secured to the side of the third lower assembly frame member 310. The rotation pins 332, secured by the aperture 330 of the corresponding rotational post support member 328, are engaged with the corresponding rotational post support member 329 to allow rotation of the second lower assembly solar cell panel frame member 308 and the third lower assembly frame member 310 between the closed and open configurations.

The solar cell panel support members of the center assembly 112 include:

(1) A first center assembly frame member 406. The first center assembly frame member 406 is a horizontally oriented planar member that is rigid with sufficient strength to support the solar cell panels 102d-102f and their associated support members. The first center assembly frame member 408 is coupled to the support structure 104.

(2) A second center assembly frame member 408. The second center assembly frame member 408 is a horizontally oriented planar member that is rigid with sufficient strength to support the solar cell panel 102d and its associated support members. A side of the second center assembly frame member 408 is rotatably coupled to a corresponding side of the first center assembly frame member 406.

(3) A third center assembly frame member 410. The third center assembly frame member 410 is a horizontally oriented planar member that is rigid with sufficient strength to support the solar cell panel 102e and its associated support members. A side of the third center assembly frame member 410 is rotatably coupled to a corresponding opposing side of the first center assembly frame member 406.

(4) A first center assembly solar cell panel frame member 412. The first center assembly solar cell panel frame member 412 is a rigid planar member that is secured to a bottom side (opposing the side that has the solar cells 208) of the solar cell panel 102f. A front side or edge of the first center assembly solar cell panel frame member 412 is rotatably coupled to the front side or edge of the first center assembly frame member 406.

(5) A second center assembly solar cell panel frame member 414. The second center assembly solar cell panel frame member 414 is a rigid planar member that is secured to a bottom side (opposing the side that has the solar cells 208) of the solar cell panel 102d. A front side or edge of the second center assembly solar cell panel frame member 414 is rotatably coupled to the front side or edge of the second center assembly frame member 408.

(6) A third center assembly solar cell panel frame member 416. The third center assembly solar cell panel frame member 416 is a rigid planar member that is secured to a bottom side (opposing the side that has the solar cells 208) of the solar cell panel 102e. A front side or edge of the third center assembly solar cell panel frame member 412 is rotatably coupled to the front side of the third center assembly frame member 410.

(7) An optional first frame support member (brace) 418. A proximal end of the first brace 418 is rotatably coupled to the second center assembly frame member 408 and is configured to extend downwardly so that the distal end of the first brace 418 is supported by the first center assembly frame member 406 when the portable solar cell array 100 is in the open configuration. The brace 418 retains the solar panel 102d in its horizontal orientation. When the portable solar cell array 100 is in the closed configuration, the first brace 418 rotatably folds within the second center assembly frame member 408. Other embodiments may employ a plurality of braces 418. Alternatively, or additionally, a floor support member (leg) may be used to provide support for the solar cell panel 102d.

(8) An optional second frame support member (brace) 420. A proximal end of the second brace 420 is rotatably coupled to the third center assembly frame member 410 and is configured to extend downwardly so that the distal end of the second brace 420 is supported by the first center assembly frame member 406 when the portable solar cell array 100 is in the open configuration. The brace 420 retains the solar panel 102e in its horizontal orientation. When the portable solar cell array 100 is in the closed configuration, the second brace 420 rotatably folds within the third center assembly frame member 410. Other embodiments may employ a plurality of braces 420. Alternatively, or additionally, a floor support member (leg) may be used to provide support for the solar cell panel 102e.

(9) A first tilt support member 422. In a preferred embodiment, a proximal end of the first tilt support member 422 is rotatably coupled to the rear side or edge of the first center assembly solar cell panel frame member 412. When the portable solar cell array 100 is in the open configuration, the rear edge of the first center assembly solar cell panel frame member 412 is rotated upwardly (tilted) so that the solar panel 102f is slanted upwardly to receive incident solar energy. The distal end of the first tilt support member 422 is then secured to proximate to the rear end of the first center assembly frame member 406 to retain the solar panel 102f in the tilted orientation. When the portable solar cell array 100 is in the closed configuration, the first tilt support member 422 folds within the first center assembly solar cell panel frame member 412. (In an alternative embodiment, the distal end of the first tilt support member 422 is rotatably coupled proximate to the rear end of the first center assembly frame member 406 so that the proximal end of the first tilt support member 422 can be secured to the first center assembly solar cell panel frame member 412 to retain the solar panel 102f in the tilted orientation.) Other embodiments may employ a plurality of first tilt support members 422.

(10) A second tilt support member 424. In a preferred embodiment, a proximal end of the second tilt support member 424 is rotatably coupled to the rear side or edge of the second center assembly solar cell panel frame member 414. When the portable solar cell array 100 is in the open configuration, the rear edge of the second center assembly solar cell panel frame member 414 is rotated upwardly (tilted) so that the solar panel 102d is slanted upwardly to receive incident solar energy. The distal end of the second tilt support member 424 is then secured to proximate to the rear end of the second center assembly frame member 408 to retain the solar panel 102d in the tilted orientation. When the portable solar cell array 100 is in the closed configuration, the second tilt support member 424 folds within the second center assembly solar cell panel frame member 414. (In an alternative embodiment, the distal end of the second tilt support member 424 is rotatably coupled proximate to the rear end of the second center assembly frame member 408 so that the proximal end of the second tilt support member 324 can be secured to the second center assembly solar cell panel frame member 414 to retain the solar panel 102d in the tilted orientation.) Other embodiments may employ a plurality of first tilt support members 424.

(11) A third tilt support member 426. In a preferred embodiment, a proximal end of the third tilt support member 426 is rotatably coupled to the rear side or edge of the third center assembly solar cell panel frame member 416. When the portable solar cell array 100 is in the open configuration, the rear edge of the third center assembly solar cell panel frame member 416 is rotated upwardly (tilted) so that the solar panel 102e is slanted upwardly to receive incident solar energy. The distal end of the third tilt support member 426 is then secured to proximate to the rear end of the third center assembly frame member 410 to retain the solar panel 102e in the tilted orientation. When the portable solar cell array 100 is in the closed configuration, the third tilt support member 426 folds within the third center assembly solar cell panel frame member 416. (In an alternative embodiment, the distal end of the third tilt support member 426 is rotatably coupled proximate to the rear end of the third center assembly frame member 410 so that the proximal end of the third tilt support member 426 can be secured to the third center assembly solar cell panel frame member 416 to retain the solar panel 102e in the tilted orientation.) Other embodiments may employ a plurality of first tilt support members 426.

(12) A first plurality of rotational post support members 328. A first one and a second one of the vertically oriented first plurality of rotational post support members 328 are coupled to the first center assembly frame member 406 on a side adjacent to the second center assembly frame member 408. A third one and a fourth one of the vertically oriented first plurality of rotational post support members 328 are coupled to the first center assembly frame member 406 on an opposing side adjacent to the third center assembly frame member 410. In the illustrated example embodiment, the first and third rotational post support members 328 are located proximate to the front end of the first center assembly frame member 406. The second and fourth rotational post support members 328 are located proximate to the rear end of the first center assembly frame member 406.

(13) The first and second rotational post support members 328 are defined by an aperture 330 that is configured to receive corresponding rotation pins 332 that are secured to the side of the second lower assembly frame member 408. The third and fourth rotational post support members 328 are also defined by an aperture 330 that is configured to receive corresponding rotation pins 332 that are secured to the side of the third lower assembly frame member 410. The rotation pins 332, secured by the aperture 330 of the corresponding rotational post support member 328, allows rotation of the second lower assembly solar cell panel frame member 408 and the third lower assembly frame member 410 between the closed and open configurations.

The solar cell panel support members of the upper assembly 114 include:

(1) A first upper assembly frame member 506. The first upper assembly frame member 506 is a horizontally oriented planar member that is rigid with sufficient strength to support the solar cell panels 102a-102c and their associated support members. The first upper assembly slider members 116a are secured to the first upper assembly frame member 506. Optionally, one or more ground support members (legs) secured to the first upper assembly frame member 506 may be used to stabilize the portable solar cell array 100 when in the open configuration (2) A second upper assembly frame member 508. The second upper assembly frame member 508 is a horizontally oriented planar member that is rigid with sufficient strength to support the solar cell panel 102a and its associated support members. A side of the second upper assembly frame member 508 is rotatably coupled to a corresponding side of the first upper assembly frame member 506.

(3) A third upper assembly frame member 510. The third upper assembly frame member 510 is a horizontally oriented planar member that is rigid with sufficient strength to support the solar cell panel 102b and its associated support members. A side of the third upper assembly frame member 510 is rotatably coupled to a corresponding opposing side of the first upper assembly frame member 506.

(4) A first upper assembly solar cell panel frame member 512. The first upper assembly solar cell panel frame member 512 is a rigid planar member that is secured to a bottom side (opposing the side that has the solar cells 208) of the solar cell panel 102c. A front side or edge of the first upper assembly solar cell panel frame member 512 is rotatably coupled to the front side or edge of the first upper assembly frame member 506.

(5) A second upper assembly solar cell panel frame member 514. The second upper assembly solar cell panel frame member 514 is a rigid planar member that is secured to a bottom side (opposing the side that has the solar cells 208) of the solar cell panel 102a. A front side or edge of the second upper assembly solar cell panel frame member 514 is rotatably coupled to the front side or edge of the second upper assembly frame member 508.

(6) A third upper assembly solar cell panel frame member 516. The third upper assembly solar cell panel frame member 516 is a rigid planar member that is secured to a bottom side (opposing the side that has the solar cells 208) of the solar cell panel 102b. A front side or edge of the third upper assembly solar cell panel frame member 516 is rotatably coupled to the front side of the third upper assembly frame member 510.

(7) An optional first frame support member (brace) 518. A proximal end of the first brace 518 is rotatably coupled to the second upper assembly frame member 508 and is configured to extend downwardly so that the distal end of the first brace 518 is supported by the first upper assembly frame member 506 when the portable solar cell array 100 is in the open configuration. The brace 518 retains the solar panel 102a in its horizontal orientation. When the portable solar cell array 100 is in the closed configuration, the first brace 518 rotatably folds within the second upper assembly frame member 508. Other embodiments may employ a plurality of braces 418. Alternatively, or additionally, a floor support member (leg) may be used to provide support for the solar cell panel 102a.

(8) An optional second frame support member (brace) 520. A proximal end of the second brace 520 is rotatably coupled to the third upper assembly frame member 510 and is configured to extend downwardly so that the distal end of the second brace 520 is supported by the first upper assembly frame member 506 when the portable solar cell array 100 is in the open configuration. The brace 520 retains the solar panel 102b in its horizontal orientation. When the portable solar cell array 100 is in the closed configuration, the second brace 520 rotatably folds within the third upper assembly frame member 510. Other embodiments may employ a plurality of braces 520. Alternatively, or additionally, a floor support member (leg) may be used to provide support for the solar cell panel 102b.

(9) A first tilt support member 522. In a preferred embodiment, a proximal end of the first tilt support member 522 is rotatably coupled to the rear side or edge of the first upper assembly solar cell panel frame member 512. When the portable solar cell array 100 is in the open configuration, the rear edge of the first upper assembly solar cell panel frame member 512 is rotated upwardly (tilted) so that the solar panel 102c is slanted upwardly to receive incident solar energy. The distal end of the first tilt support member 522 is then secured to proximate to the rear end of the first center assembly frame member 506 to retain the solar panel 102c in the tilted orientation. When the portable solar cell array 100 is in the closed configuration, the first tilt support member 522 folds within the first upper assembly solar cell panel frame member 512. (In an alternative embodiment, the distal end of the first tilt support member 522 is rotatably coupled proximate to the rear end of the first upper assembly frame member 506 so that the proximal end of the first tilt support member 522 can be secured to the first upper assembly solar cell panel frame member 512 to retain the solar panel 102c in the tilted orientation.) Other embodiments may employ a plurality of first tilt support members 522.

(10) A second tilt support member 524. In a preferred embodiment, a proximal end of the second tilt support member 524 is rotatably coupled to the rear side or edge of the second upper assembly solar cell panel frame member 514. When the portable solar cell array 100 is in the open configuration, the rear edge of the second upper assembly solar cell panel frame member 514 is rotated upwardly (tilted) so that the solar panel 102a is slanted upwardly to receive incident solar energy. The distal end of the second tilt support member 524 is then secured to proximate to the rear end of the second upper assembly frame member 508 to retain the solar panel 102a in the tilted orientation. When the portable solar cell array 100 is in the closed configuration, the second tilt support member 524 folds within the second upper assembly solar cell panel frame member 514. (In an alternative embodiment, the distal end of the second tilt support member 524 is rotatably coupled proximate to the rear end of the second upper assembly frame member 508 so that the proximal end of the second tilt support member 524 can be secured to the second upper assembly solar cell panel frame member 414 to retain the solar panel 102a in the tilted orientation.) Other embodiments may employ a plurality of first tilt support members 524.

(11) A third tilt support member 526. In a preferred embodiment, a proximal end of the third tilt support member 526 is rotatably coupled to the rear side or edge of the third upper assembly solar cell panel frame member 516. When the portable solar cell array 100 is in the open configuration, the rear edge of the third upper assembly solar cell panel frame member 516 is rotated upwardly (tilted) so that the solar panel 102b is slanted upwardly to receive incident solar energy. The distal end of the third tilt support member 526 is then secured to proximate to the rear end of the third upper assembly frame member 510 to retain the solar panel 102b in the tilted orientation. When the portable solar cell array 100 is in the closed configuration, the third tilt support member 526 folds within the third upper assembly solar cell panel frame member 516. (In an alternative embodiment, the distal end of the third tilt support member 526 is rotatably coupled proximate to the rear end of the third upper assembly frame member 510 so that the proximal end of the third tilt support member 326 can be secured to the third upper assembly solar cell panel frame member 516 to retain the solar panel 102b in the tilted orientation.) Other embodiments may employ a plurality of first tilt support members 526.

(12) A first plurality of rotational post support members 328. A first one and a second one of the vertically oriented first plurality of rotational post support members 328 are coupled to the first upper assembly frame member 506 on a side adjacent to the second upper assembly frame member 508. A third one and a fourth one of the vertically oriented first plurality of rotational post support members 328 are coupled to the first upper assembly frame member 506 on an opposing side adjacent to the third upper assembly frame member 510. In the illustrated example embodiment, the first and third rotational post support members 328 are located proximate to the front end of the first upper assembly frame member 506. The second and fourth rotational post support members 328 are located proximate to the rear end of the first upper assembly frame member 506.

(13) The first and second rotational post support members 328 are defined by an aperture 330 that is configured to receive corresponding rotation pins 332 that are secured to the side of the second upper assembly frame member 508. The third and fourth rotational post support members 328 are also defined by an aperture 330 that is configured to receive corresponding rotation pins 332 that are secured to the side of the third upper assembly frame member 510. The rotation pins 332, secured by the aperture 330 of the corresponding rotational post support member 328, allows rotation of the second upper assembly solar cell panel frame member 508 and the third upper assembly frame member 510 between the closed and open configurations.

Figure 5:
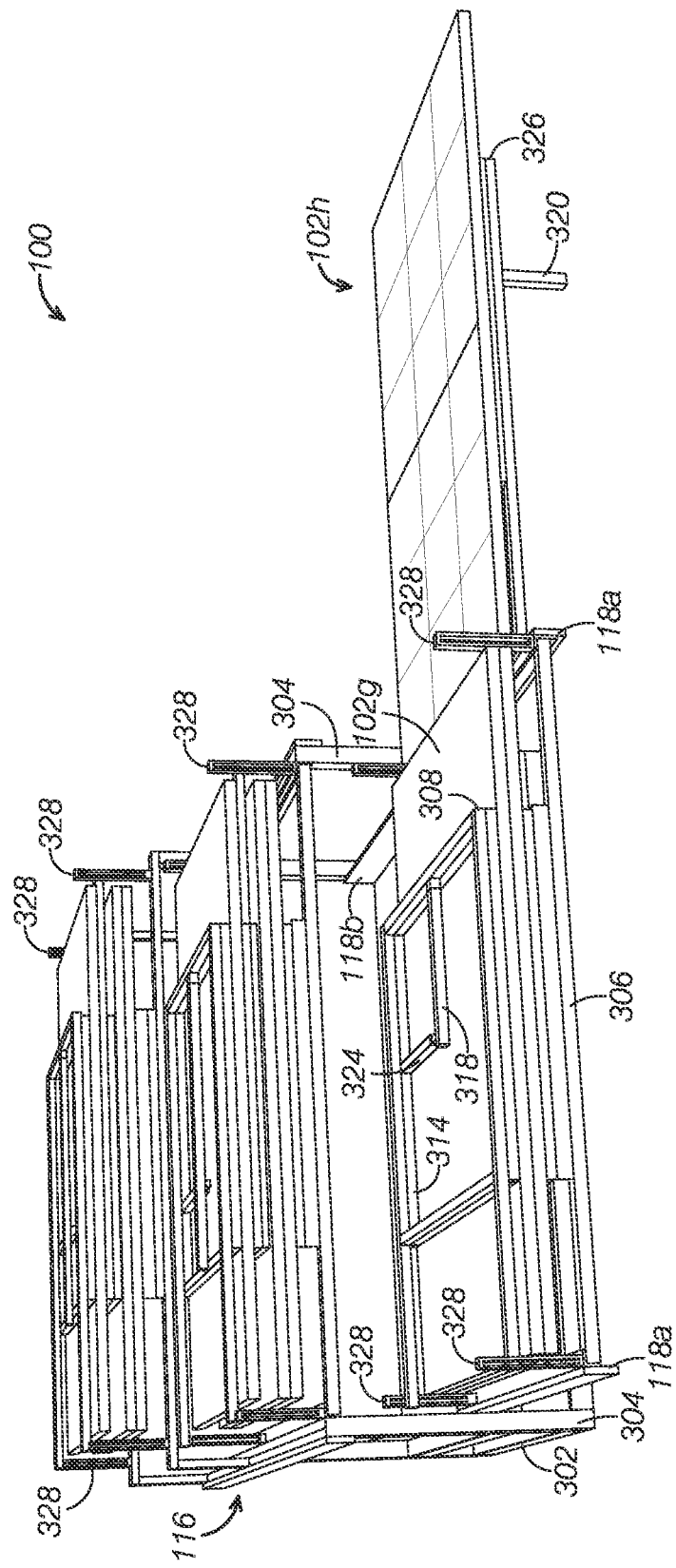
FIG. 5 is a diagram of the portable solar cell array with a solar cell panel in a folded out position.

FIG. 5 is a diagram of the portable solar cell array 100 with the solar cell panel 102i in a folded out position. After the portable solar cell array 100 is positioned in a desired orientation, the lower assembly 110 is slid to its outward and fully extended position. The topmost solar panel 102h is then rotated outwardly (flipped) about the pins 332 so that the solar panel 102h is then horizontally oriented. The solar panels 208 are then facing upwardly. The leg 320 is rotated downwardly to its vertical orientation.

Figure 6:
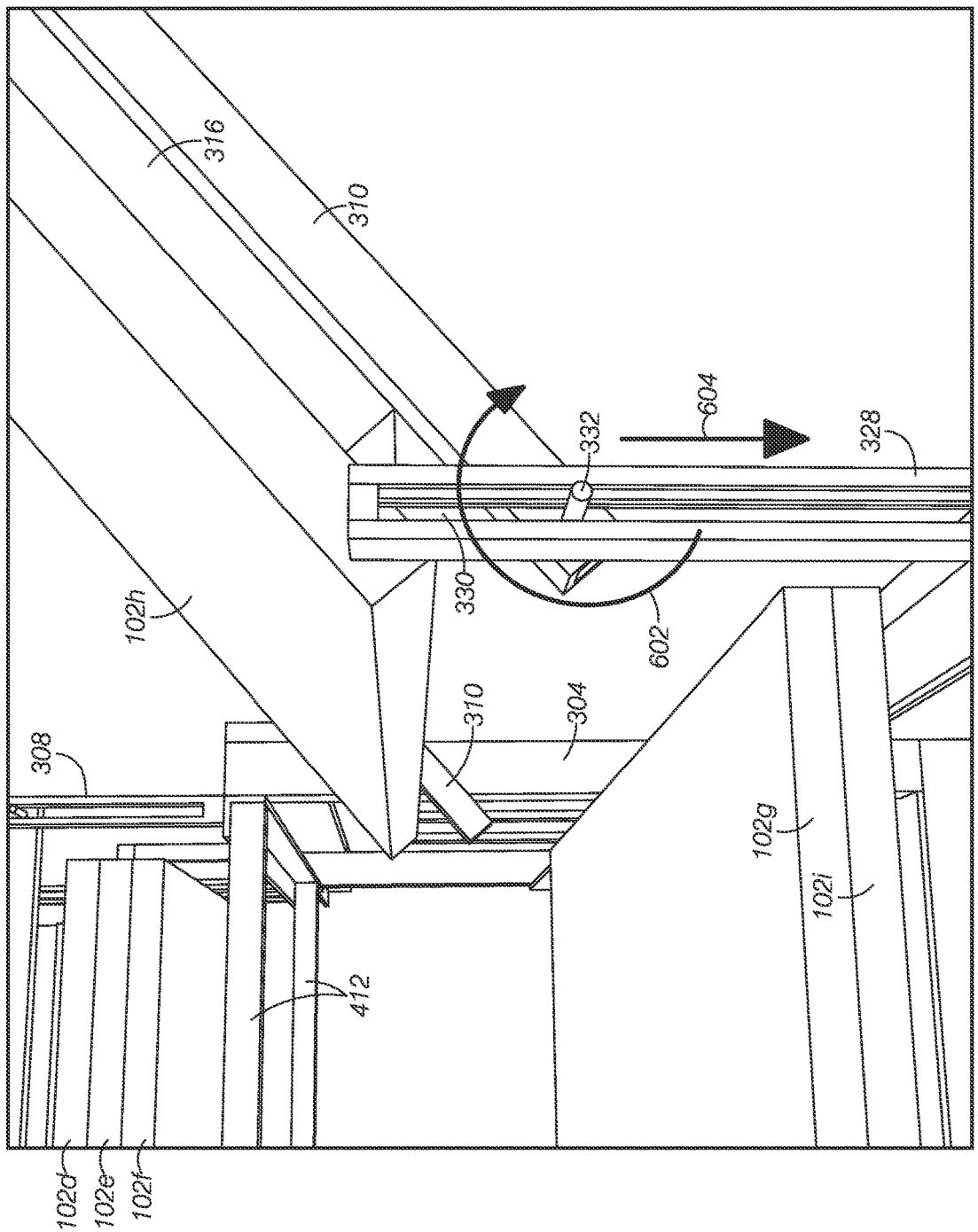
FIG. 6 is a close up view of the rotational post support members and the aperture that receives the pin.

FIG. 6 is a close up view of the rotational post support members 328 and the aperture 330 that receives and engages with the pin 332. In a preferred embodiment, the aperture 330 is a slot. The vertically oriented slot 330 and the engaged pin 332 allows rotation (conceptually illustrated by the rotation arrow 602) of the solar panel 102h from its initial folded position (when in the closed configuration) to an open position as the portable solar cell array 100 is being opened up into its open configuration. When the portable solar cell array 100 is closed, the aperture 330 and the pin 332 allow the solar panel 102h to be rotated back over to lie on top of the solar panel 102g (interchangeably referred to herein as a folded configuration). Here, in response to closing the portable solar cell array 100 into a closed configuration so that, for example, the third lower assembly frame member 310 is above the first lower assembly frame member 306, the pins 332 are at an upper end of the slot 330 so that the third lower assembly frame member 310 is at a first elevation.

It is appreciated that elevation of the now horizontal solar panel 102h is above the elevation of adjacent solar panel 102i after the rotation 602. Here, the pins 332 are at a an upper end of the vertically oriented slot 330. The slot 330 then permits the pin 332, and the solar panel 102h and its support members, to be moved downwardly (conceptually illustrated by the downward arrow 604) to become horizontally aligned with the solar panel 102i along the same elevation, or substantially the same elevation. For example, in response to opening the portable solar cell array 100 into the open configuration so that the third lower assembly frame member 310 is adjacent the first lower assembly frame member 306, the pins 332 are at a lower end of the vertically oriented slot 330 so that the third lower assembly frame member 310 is at a second elevation that is lower than the first elevation.

The other rotational post support members 328 are similarly configured with slots 330. After each of the solar cell panels 102a, 102b, 102d, 102e, and 102f are rotated outwardly to their folded out positions, each of these solar panels may be lowered so as to become horizontally aligned with the solar panels 102c, 102f, and 102i, respectively. When the portable solar cell array 100 is closed, the slots 330 and pins 332 cooperatively allow the solar panels to be raised for closing.

Figure 7:
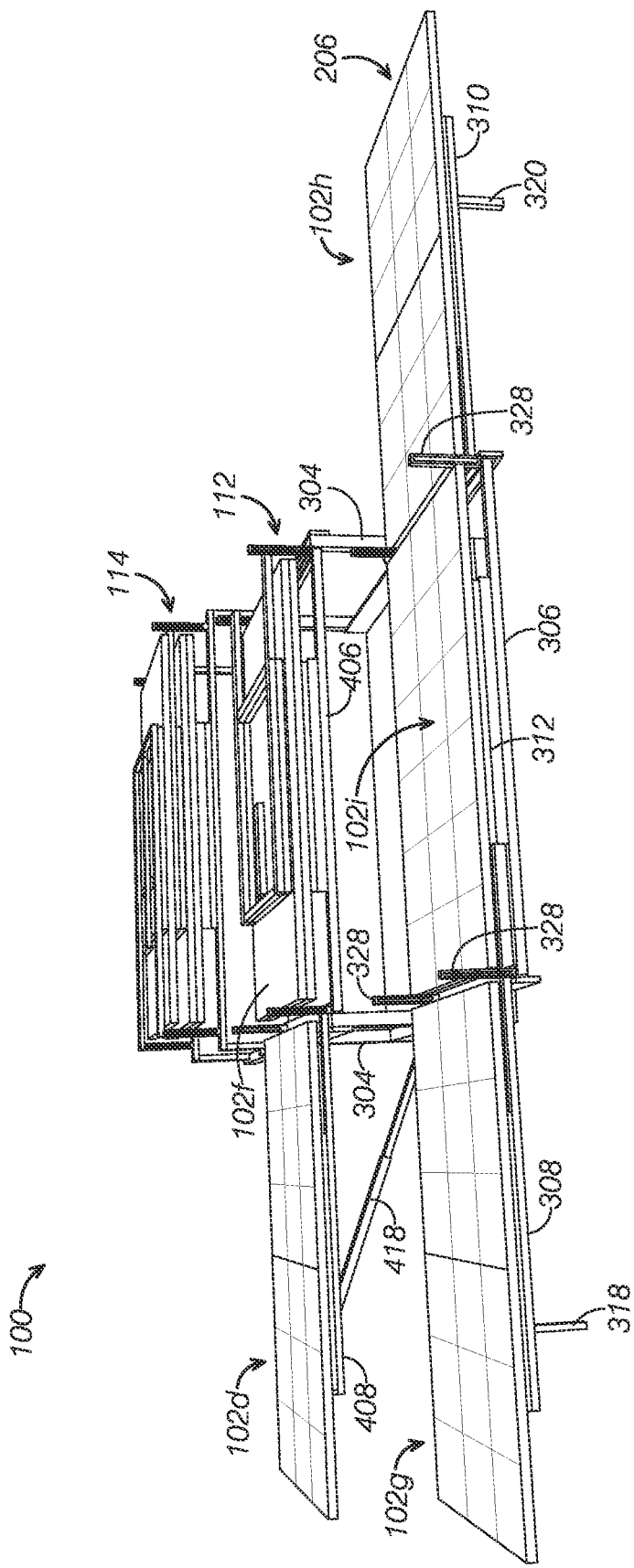
FIG. 7 is a diagram illustrating the solar cell panels in their open configuration.

FIG. 7 is a diagram illustrating the solar cell panels 102g-102i in their open configuration. Here, the solar cell panels 102g-102i are aligned in the horizontal row 206.

Additionally, the solar panel 102d is illustrated in its folded out position. The brace 418 retains the solar panel 102d in its horizontal orientation.

In FIG. 7, the solar panel 102f has not yet been folded over to its open position. The solar panel 102f is laying over the solar panel 102e. The above-described support members are now accessible to the installer so that the solar panel 102f can be outwardly rotated into its open position. The brace 418 retains the solar panel 102d in its horizontal orientation.

Figure 8:
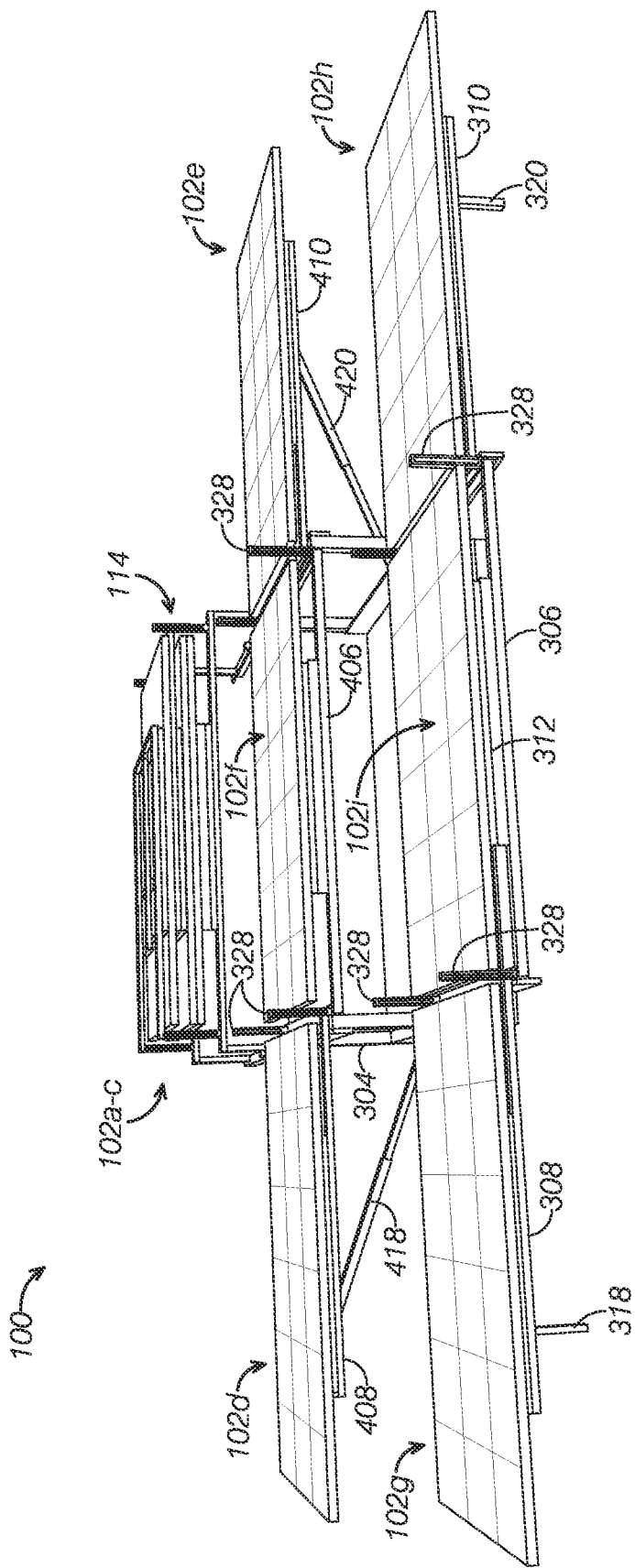
FIG. 8 is a diagram illustrating the solar cell panels in their open configuration.

FIG. 8 is a diagram illustrating the solar cell panels 102d-102i in their open configuration. Here, the solar cell panels 102d-102f are aligned in the horizontal row 204. The brace 420 retains the solar panel 102e in its horizontal orientation.

Figure 9:
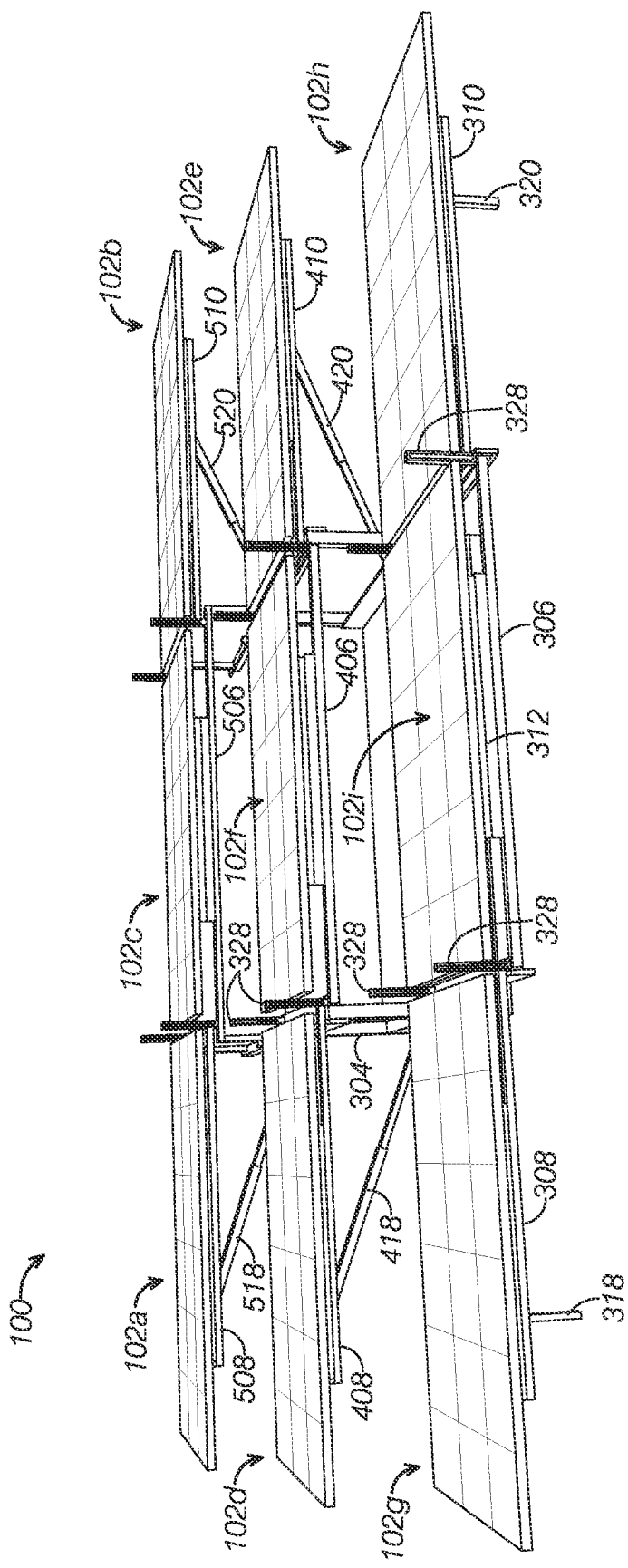
FIG. 9 is a diagram illustrating the solar cell panels in their open configuration.

FIG. 9 is a diagram illustrating the solar cell panels 102a-102i in their open configuration. Here, the solar cell panels 102a-102c are aligned in the horizontal row 202. The brace 518 retains the solar panel 102a in its horizontal orientation. The brace 520 retains the solar panel 102c in its horizontal orientation.

After the solar cell panels 102a-102c have been rotated or folded open as illustrated in FIG. 9, the solar cell panels 102a-102a are horizontally oriented. Such a horizontal orientation is not necessarily optimal since the orientation of the solar cell panels 102a-102i, when horizontal, may not be pointed towards the sun.

Figure 10:
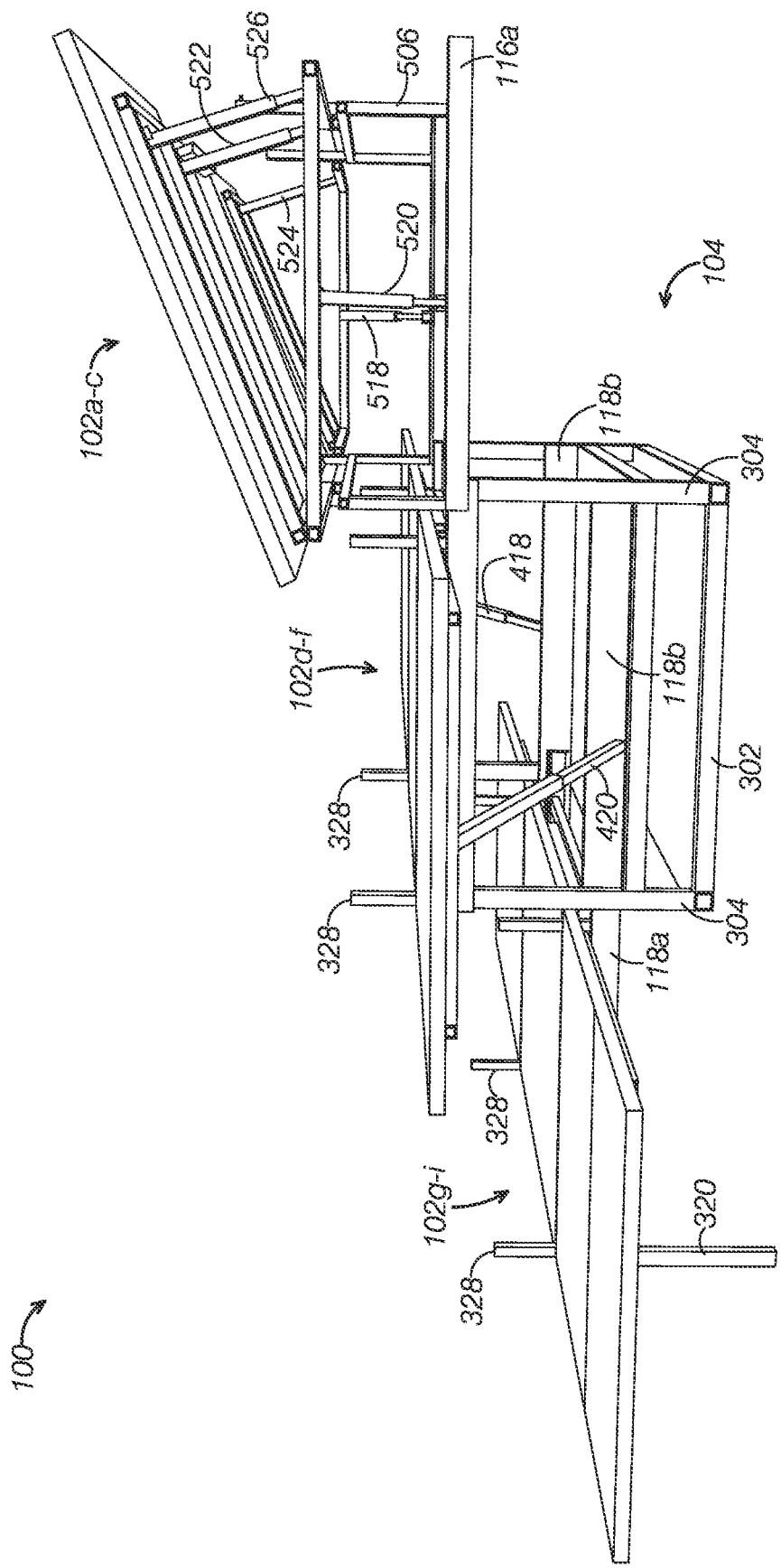
FIG. 10 is a diagram illustrating the solar cell panels rotated to their tilted position.

FIG. 10 is a diagram illustrating the solar cell panels 102a-102c rotated to their tilted position. Tilting allows adjustment of the orientation of a solar cell panel 102 to point towards the sun more directly. The installer tilts the solar panel 102, and then uses the associated tilt support member to retain the solar panel in its tilted position. For example, the tilted solar panel 102c is retained in the tilted position by the tilt support member 526. In some embodiments, the tilt support members are telescoping tubular members that have an adjustable length. Any type of suitable tilt support member may be used in the various embodiments.

Figure 11:
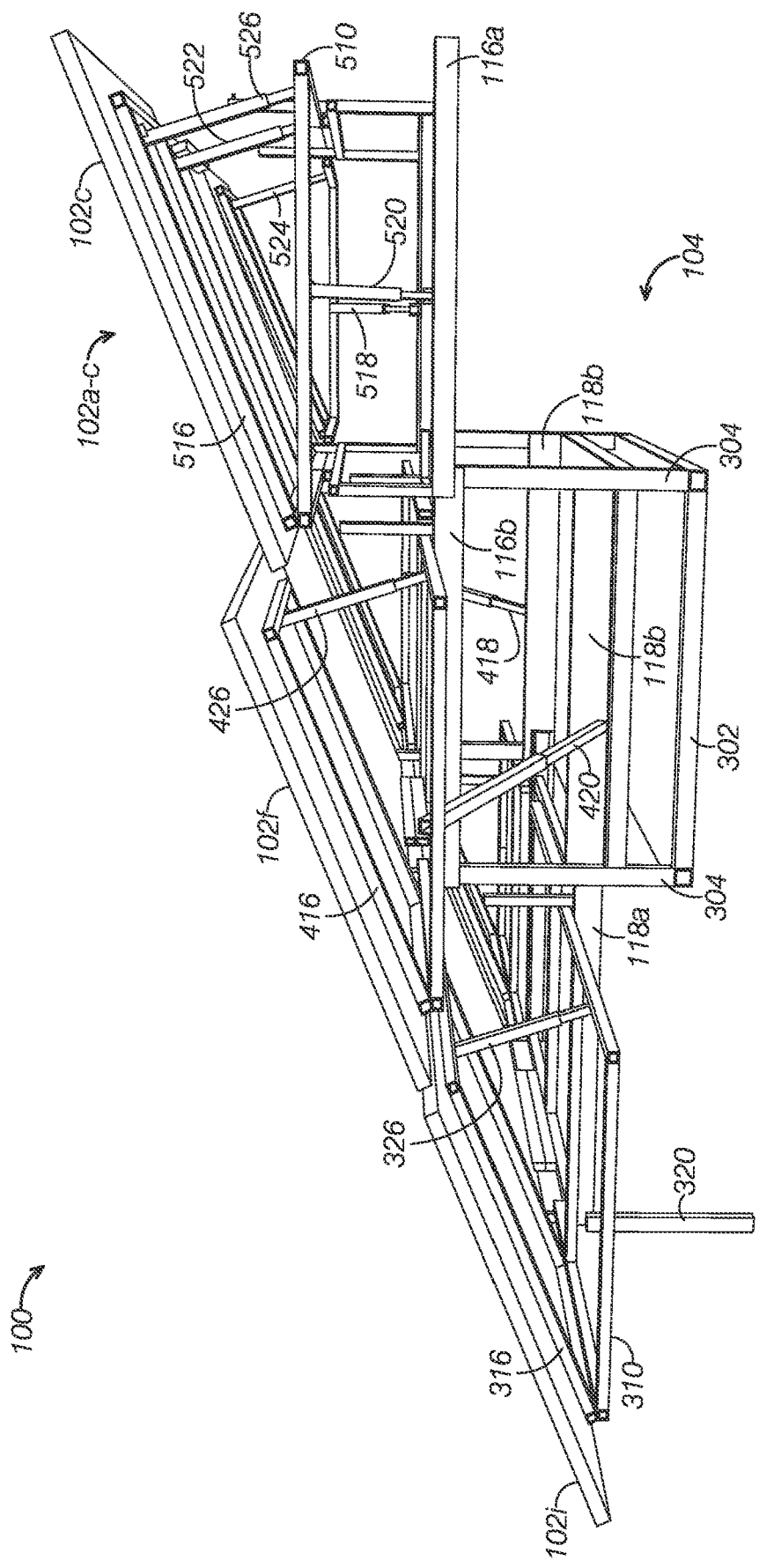
FIG. 11 is a diagram of the portable solar cell array with all of the solar cell panels open and tilted.

FIG. 11 is a diagram of the portable solar cell array 100 with all of the solar cell panels 102a-102i open and tilted. FIG. 11 corresponds to a different view of the portable solar cell array 100 in the open configuration that is illustrated in FIG. 2.

The ordering of the solar cell panels 102a-102i may vary in alternative embodiments. For example, but not limited to, the solar panel 102a is illustrated as being on top of the solar panel 102b when the portable solar cell array 100 is in the closed configuration. Here, during the opening process, the solar panel 102a is first rotated outwardly to its open position. Then, the solar panel 102b is rotated outwardly to its open position. In an alternative embodiment, the solar panel 102b may be configured to be on top of the solar panel 102a when the portable solar cell array 100 is in the closed configuration. Here, during the opening process, the solar panel 102b is first rotated outwardly to its open position. Then, the solar panel 102a is rotated outwardly to its open position.

Spacers, bumpers or the like (not shown) may be optionally used to avoid direct contact of the solar collecting surfaces of the solar cell panels 102 with the various support members and/or the other solar cell panels 102. For example, a plurality of bumpers may be secured to the upper surface of the first lower assembly frame member 306 such that when the third lower assembly frame member 310 is folded over onto the top of the first lower assembly frame member 306 (closed configuration), the plurality of bumpers support the third lower assembly frame member 310 and maintain a designed spacing between the first lower assembly frame member 306 and the third lower assembly frame member 310. Alternatively, or additionally, bumpers may be located on the upper surface of the third lower assembly frame member 310 third lower assembly frame member 310. Similarly, a plurality of bumpers may be secured to the other frame members described herein. In some embodiments, a rubber or foam strip may be affixed to the frame members and/or the solar cell panels to prevent solar cell panel glass from resting on the frame or other solar panels.

The surface of the solar collecting surface of the solar cell panels 102 may have a protective coating, film, or cover that is transparent for protection against contact with the pivot arms and/or other solar cell panels 102. Such a protective coating, film, or cover may protect the solar collecting surface of the solar cell panels 102 from the elements when the portable solar cell array 100 is in use.

Figure 12:
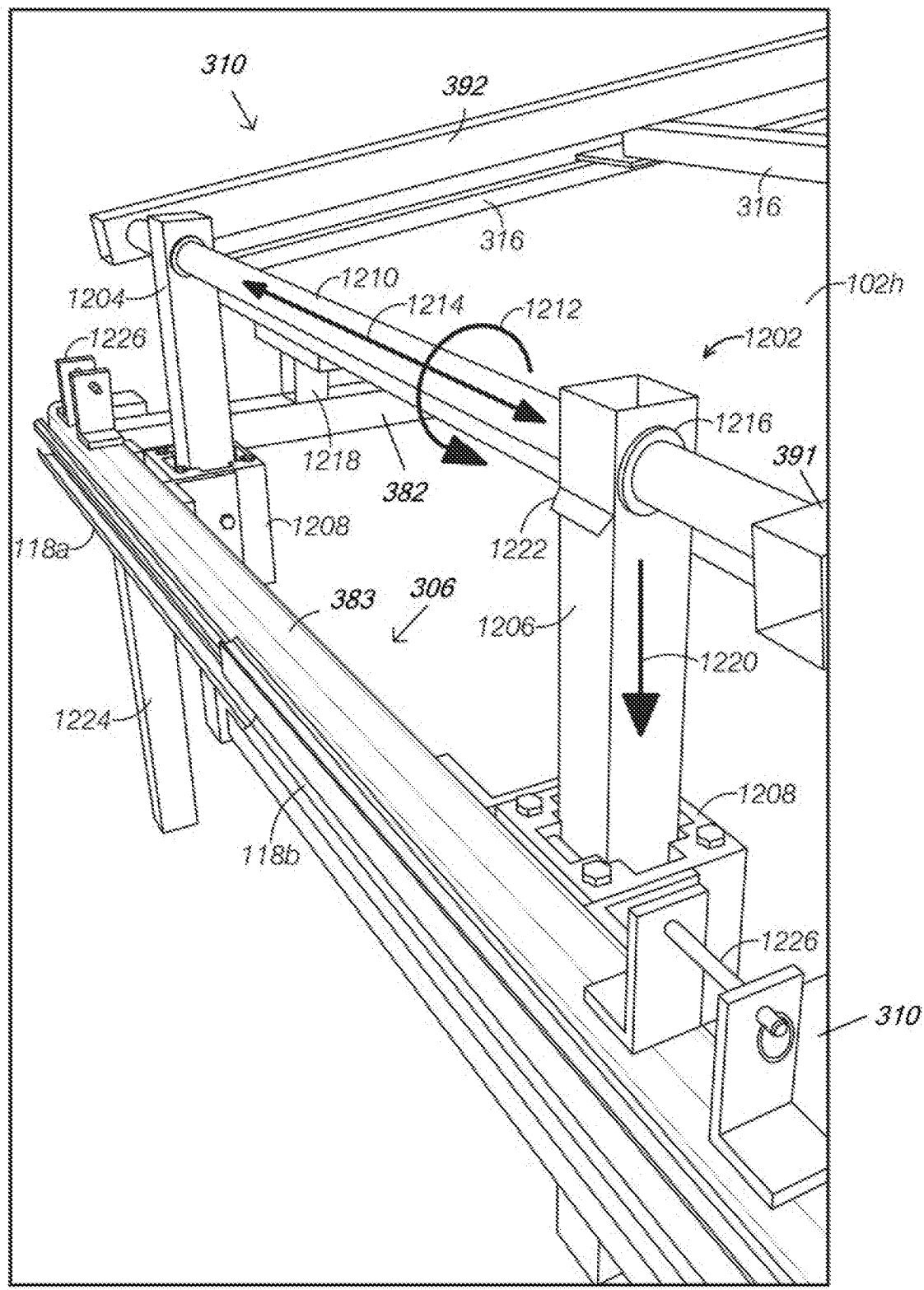
FIG. 12 illustrates an alternative embodiment of a roller assembly.

FIG. 12 illustrates an alternative embodiment of a roller assembly 1202. Here, the portable solar cell array 100 is illustrated in the closed configuration or a partially closed configuration. The roller assembly 1202 replaces the above-described rotational post support members 328 and pins 332 to provide rotation of the solar cell panels 102 into their position when in the closed configuration and the open configuration of the portable solar cell array 100.

As shown in FIG. 12, a second frame 310 (also referred to herein as third lower assembly frame member 310) is rotatably coupled to a first frame 306 (also referred to herein as first lower assembly frame member 306). With reference to FIG. 12, first frame 306 includes a front end member 381, a rear end member 382, and a cross member 383. As depicted in FIG. 12, rear end member 382 is spaced from front end member 381 and cross member 383 extends from front end member 381 to rear end member 382.

As further shown in FIG. 12, second frame 310 includes a front member 391 and a rear member 392. As depicted in FIG. 12, front member 391 is proximate to front end member 381 and extends transversely relative to cross member 383. The reader can further see in FIG. 12 that rear member 392 is proximate to rear end member 382 and also extends transversely relative to cross member 383.

The roller assembly 1202 comprises a first post 1204, a second post 1206, a plurality of post receivers 1208, and a roller bar 1210. The apertures located proximate to the proximal upper end of the first post 1204 and the second post 1206 re included with diameters configured to slidably receive the roller bar 1210. The roller bar 1210 is able to be freely rotated while being retained in position in the apertures of the posts 1204, 1206. Some embodiments may employ additional posts and post receivers 1208.

A first post receiver 1208 is secured proximate to the front of the first lower assembly frame member 306, and is configured to slidably receive and retain the first post 1204. A second post receiver 1208 is secured proximate to the rear of the first lower assembly frame member 306, and is configured to slidably receive and retain the second post 1206.

The proximal end of the roller bar 1210 is secured to front member 391 of second frame 310 in the example embodiment illustrated in FIG. 12. The distal end of the roller bar 1210 is secured to rear member 392 of second frame 310. Here, welds rigidly secure the roller bar 1210 to second frame 310. Other securing means may be used, such as screws, bolts, adhesive, brackets, or the like. During rotation of second frame 310 to either the closed or open position, the roller bar 1210 freely rotates (denoted by the directional arrow 1212) about a rotational axis 1214. In the illustrated embodiment, the side member of second frame 310 may be optionally omitted because of the structural strength provided by the roller bar 1210 to second frame 310.

A plurality of retainers 1216 retain the roller bar 1210 to prevent sliding of the roller bar 1210 along the rotational axis 1214. In the illustrated example embodiment, the retainers 1216 are washer-like rings secured to the roller bar 1210. Accordingly, the front and rear ends of second frame 310 are held in alignment with the front and rear ends of first frame 306. Retainers 1216 may be secured to the roller bar 1210 using a weld, one or more fasteners (screws or bolts), an adhesive, etc. In some embodiments, the retainers 1216 may be screws and/or bolts secured through the roller bar 1210. Alternatively, or additionally, the retainers 1216 may be welded protrusions extending outwardly from the surface of the roller bar 1210.

Figure 13:
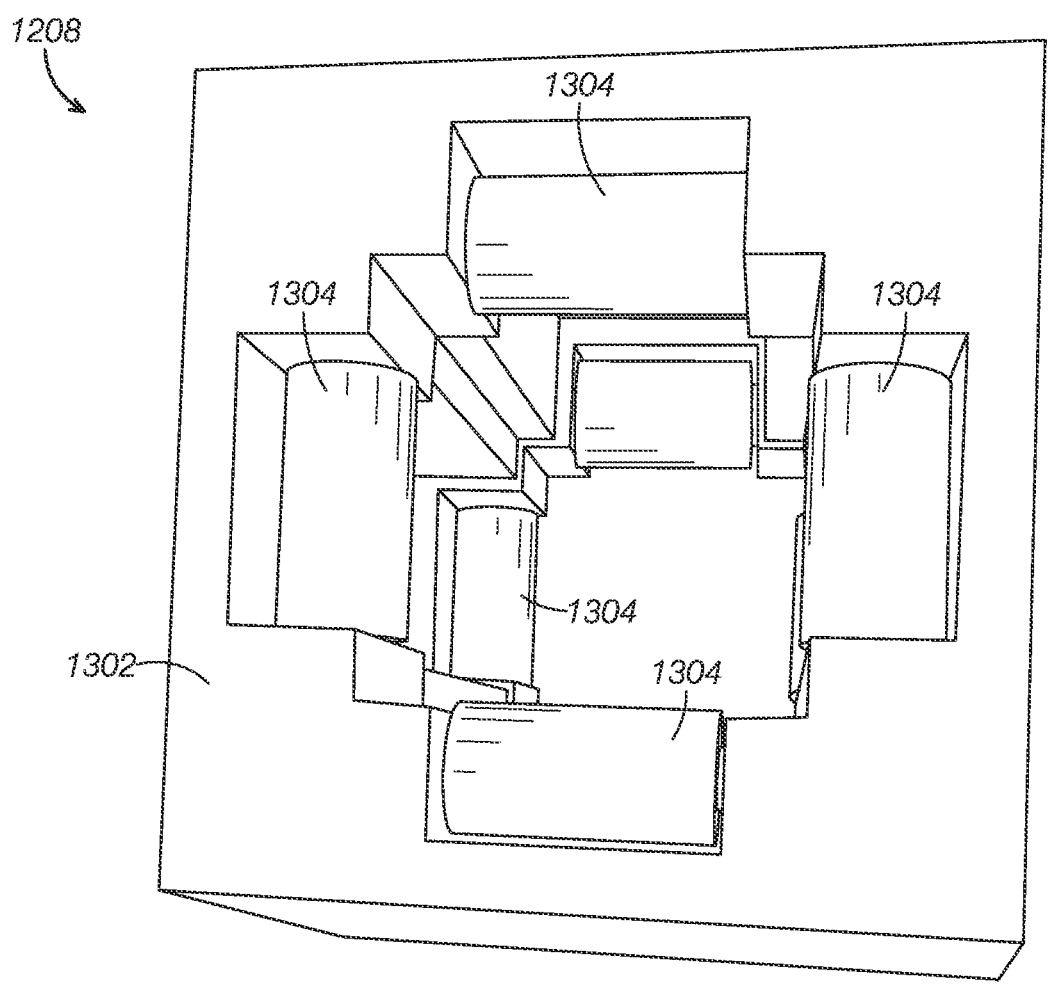
FIG. 13 is a diagram of a post receiver.

FIG. 13 is a diagram of the post receiver 1208. The post receiver 1208 comprises a body member 1302 and a plurality of optional guide rollers 1304 rotatably secured within an interior 1306 of the body member 1302. In the example embodiment of FIGS. 12 and 13, the first post 1204 and the second post 1206 are square tubular posts. The corners of the interior 1306 of the body member 1302 are configured to slidably retain the corners of the posts 1204, 1206 while permitting the posts 1204, 1206 to freely slide upwardly and downwardly when second frame 310 is rotated or folded into the opened or closed configurations.

The guide rollers 1304 are cylindrical member set back into the interior of the body member 1302 with their ends rotatably coupled to the body member 1302. Here, the protruding edges of each guide roller 1304 engage a side of the square post 1204, 1206. As the post 1204, 1206 slides upwardly or downwardly, the guide rollers 1304 rotate and maintain contact with the side surface of each post 1204, 1206, thereby retaining the posts 1204, 1206 in a vertical orientation while reducing friction resistance to the sliding movement of the posts 1204, 206.

In the example embodiment illustrated in FIG. 13, there are four upper guide rollers 1304 proximate to the upper end of the post receiver 1208 and four lower guide rollers 1304 proximate to the lower end of the post receiver 1208. The upper and lower guide rollers 1304 cooperate to retain the posts 1204, 1206 in their vertical orientation. In alternative embodiments, any number of guide rollers 1304 may be used without departing for the scope of the present invention.

Further, the interior 1306 of the body member 1302 may be configured to receive any shaped post 1204, 1206. For example, but not limited to, the posts 1204, 1206 may be circular, hexagonal, octagonal, etc., in cross section. The interior 1306 of the body member 1302 may have any corresponding shape so as to retain the post 1204, 1206 in their vertical orientation.

In an alternative embodiment, the guide rollers 1304 may be a ball bearing assembly or system to reduce frictional forces when the posts 1204, 1206 are upwardly or downwardly sliding during opening and closing of second frame 310. Alternatively, the guide rollers 1304 may be replaced by, or supplemented with, a suitable lubricant.

Returning to FIG. 12, second frame 310 is illustrated when the portable solar cell array 100 is in its closed configuration such that second frame 310 is laying on top of first frame 306, the third lower assembly frame member 310, or both assemblies 306, 310 (depending upon the configuration of the portable solar cell array 100). The solar panels 102a, 102b, 102d, 102e, 102f are similarly secured to their respective frame members 306, 308, 310.

An optional bumper 1218, interchangeably referred to herein as an elevation guide 1218, is secured to the upper surface of the front of first frame 306 proximate to the side edge of first frame 306. The bumper 1218 retains second frame 310 in its horizontal orientation and spaced apart from first frame 306 by a predefined distance. Preferably, an optional second bumper 1218 (not shown) is similarly secured to the upper surface of the rear of first frame 306. Additionally, or alternatively, other bumpers 1218 may be secured to the upper surface of first frame 306 at other locations. When second frame 310 is in its closed position, the bumpers 1218 retain second frame 310 above first frame 306 at the predefined first distance.

Because the roller bar 1210 is rigidly secured to second frame 310, the roller bar 1210 is at a corresponding second predefined distance (which may be the same as the first predefined distance) above the upper surface of each post receiver 1208. In the various embodiments, the posts 1204, 1206 have an upper portion having a length corresponding to the second predefined distance. The posts 1204, 1206 have a lower portion having a length sufficiently long enough to extend the lower distal end of the post 1204, 1206 through the body member 1302 of the post receiver 1208 when the portable solar cell array 100 is in the closed configuration. Accordingly, the post receiver 1208 securely and rigidly retains the post 1204, 1206 is its vertical orientation when second frame 310 is in its closed position above first frame.

Figure 14:
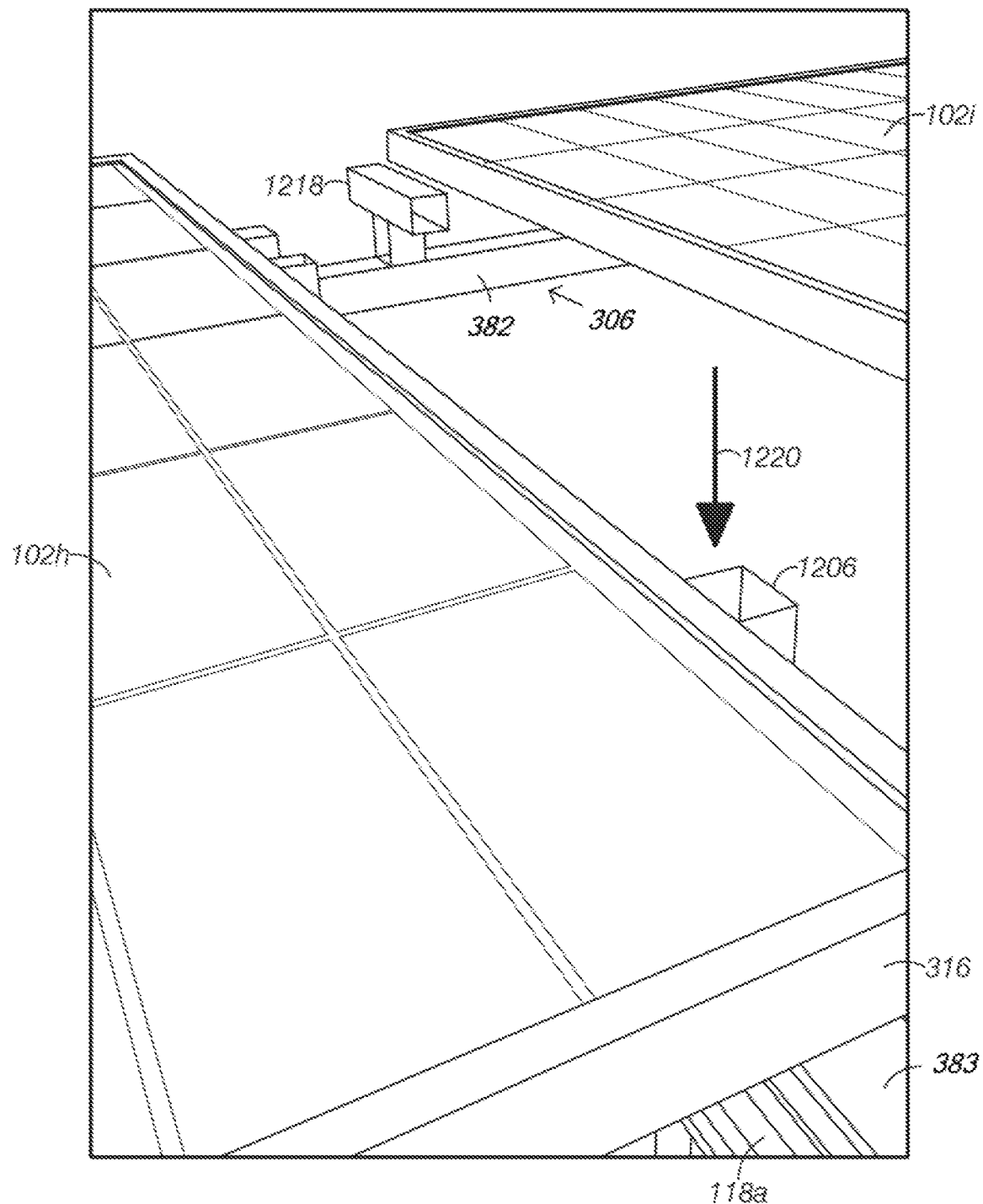
FIG. 14 illustrates an alternative embodiment of the roller assembly of FIG. 12 when the portable solar cell array is in the open configuration.

FIG. 14 illustrates the alternative embodiment of a roller assembly 1202 of FIG. 12 when the portable solar cell array 100 is in the open configuration. When second frame 310 is rotated outwardly to its open position, the post 1204, 1206 slides downwardly (denoted by the directional arrow 1220 shown in FIG. 12) through the post receiver 1208. During the initial stages of the opening process, the bumpers 1218 engage the lower surface of second frame 310, acting as a lever system that begins to force the roller bar 1210 and the posts 1204, 1206 downwardly.

During this opening process, the travel distance of the post 1204, 1206 is less than or equal to the length of the upper portion of the post 1204, 1206. When second frame 310 is finally in its open position, the elevation of second frame 310 has decreased so that second frame 310 is now aligned with, or is substantially aligned with, the elevation of first frame 306. That is, the posts 1204, 1206 and the corresponding post receivers 1208 cooperatively allow the elevation of second frame 310 to change from a first predefined elevation above first frame 306 (when in the closed position) to a second predefined elevation corresponding to the elevation of first frame 306 (when in the open position).

In the various embodiments, the length of the lower portion of the posts 1204, 1206 are not so long as to engage the surface of the earth where the portable solar cell array 100 is being opened. That is, the distal end of the posts 1204, 1206 do not interfere with the downward travel of the upper portion of the post 1204, 1206 when second frame 310 is rotated or folded into its open position.

Some embodiments may include an optional stop 1222 secured at a location on the upper portion of the post 1204, 1206 proximate to and below the aperture that receives the roller bar 1210. When second frame 310 has been rotated to its open position and the post 1204, 1206 has travelled in its downward direction, the stop 1222 prevents further downward movement of the post 1204, 1206. The stop 1222 may also provide structural support to retain the post 1204, 1206 and second frame 310 at its predefined lower elevation. In other embodiments, the roller bar 1210 may engage the upper surface of the post receiver 1208 to stop the further downward travel of the post 1204, 1206. Alternatively, or additionally, bumpers may be secured to second frame 310 to stop the further downward travel of the post 1204, 1206.

FIG. 12 illustrates an optional support leg 1224 wherein the proximal end is secured to the front of the first lower assembly frame member 306. The support leg 1224 engages the surface of the earth to provide additional support to the portable solar cell array 100 when in the open configuration. In some embodiments, the distal end of the support leg 1224 may include a wheel or other suitable roller. The wheel or roller will facilitate the outward sliding movement of the first lower assembly frame member 306 to its extended position when the portable solar cell array 100 is opened.

An alternative embodiment may employ a rotational member that is secured to a side of second frame 310 and to the top proximal end of the posts 1204, 1206. The rotational member may be a hinge, pivot joint, ball joint or the like. In such embodiments, the roller bar 1210 and the post aperture are replaced with the rotational member that is coupled to the distal end of each post 1204, 1206.

The novel roller assembly 1202 may be used to rotatably couple other devices and/or systems together. For example, a table, lounge chair or the like may use the roller assembly 1202 to open and close. Embodiments or the roller assembly 1202 may be particularly advantageous when the height of one of the rotatably coupled members needs to be adjusted or controlled during the opening process.

The example embodiment illustrated in FIG. 12 may include one or more optional locking pin devices 1226. When the pin is secured to the locking brackets, the locking pin device retains second frame 310 in its open position. A locking pin device 1226 may be advantageous when the portable solar cell array 100 is used in a location that may be subject to high velocity winds.

An example benefit of a portable solar cell array 100, may be realized during a natural disaster or emergency situation. A plurality of closed portable solar cell arrays 100 may be transported to the disaster scene. Individual portable solar cell arrays 100 can be easily moved to location wither electric power is needed. In some embodiments, a plurality of portable solar cell arrays 100 may be electrically connected together to provide a desired amount (capacity) of electric power.

As another example in use, a closed portable solar cell array 100 may be stored for transportation in a vehicle, such as an automobile, truck or other recreational vehicle. The user may then use their portable solar cell array 100 to provide power, such as at a camp site or the like.

t should be emphasized that the above-described embodiments of the portable solar cell array 100 are merely possible examples of implementations of the invention. Many variations and modifications may be made to the above-described embodiments. All such modifications and variations are intended to be included herein within the scope of this disclosure and protected by any later filed claims.

Furthermore, the disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower, or equal in scope to the original claims, are to be considered within the subject matter of the inventions described herein.

Therefore, having thus described the invention, at least the following is claimed:

1. A system, comprising:
    a first frame including:
        a front end;
        a rear end spaced from the front end; and
        a cross member extending from the front end to the rear end;
    a second frame rotatably coupled to the first frame, the second frame including:
        a front member proximate to the front end and extending transversely relative to the cross member; and
        a rear member proximate to the rear end and extending transversely relative to the cross member;
    a vertically oriented first post with a first aperture located proximate to a proximal end of the first post;
    a vertically oriented second post with a second aperture located proximate to a proximal end of the second post;
    a first post receiver secured to the cross member proximate the front end, wherein the first post receiver is configured to slidably receive and retain the first post;
    a second post receiver secured to the cross member proximate the rear end, wherein the second post receiver is configured to slidably receive and retain the second post; and
    a roller bar with a proximal end secured to the front member and with a distal end secured to the rear member,
    wherein:
        the roller bar is extended through the first aperture of the first post and is extended through the second aperture of the second post so that the second frame is rotatably coupled to the first frame;
        the system is configured to move between a closed configuration and an open configuration;
        the second frame is above the first frame in the closed configuration;
        the second frame is adjacent to the first frame in the open configuration;
        the second frame is at a first elevation in the closed configuration; and
        the second frame is at a second elevation that is lower than the first elevation in the open configuration.

2. The system of claim 1, wherein the first post receiver defines a receiver aperture that receives the first post and retains the first post in a vertical orientation in response to closing the system into the closed configuration and in response to opening the system into the open configuration.

3. A system, comprising:
    a first frame including:
        a front end;
        a rear end spaced from the front end; and
        a cross member extending from the front end to the rear end;
    a second frame rotatably coupled to the first frame, the second frame including:
        a front member proximate to the front end and extending transversely relative to the cross member; and
        a rear member proximate to the rear end and extending transversely relative to the cross member;
    a vertically oriented first post with a first aperture located proximate to a proximal end of the first post;
    a vertically oriented second post with a second aperture located proximate to a proximal end of the second post;
    a first post receiver secured to the cross member proximate the front end, wherein the first post receiver is configured to slidably receive and retain the first post;

a second post receiver secured to the cross member proximate the rear end, wherein the second post receiver is configured to slidably receive and retain the second post; and a roller bar with a proximal end secured to the front member and with a distal end secured to the rear member, wherein:

the roller bar is extended through the first aperture of the first post and is extended through the second aperture of the second post so that the second frame is rotatably coupled to the first frame;

the first post receiver defines a receiver aperture that receives the first post and retains the first post in a vertical orientation in response to closing the system into the closed configuration and in response to opening the system into the open configuration;

the first post receiver extends from:

a bottom distal the roller bar to a top proximate the roller bar, a first lateral side proximate the cross member to a second lateral side distal the first lateral side; and a first longitudinal side proximate the front end to a second longitudinal side proximate the rear end;

the receiver aperture extends from the bottom to the top of the first post receiver;

the first post receiver includes a first guide member mounted inside the receiver aperture proximate the top and the first lateral side of the first post receiver; and the first guide member is configured to engage the first post when the first post is received in the receiver.

4. The system of claim 3, wherein the first post receiver includes a second guide member mounted inside the receiver aperture proximate the top and the second lateral side of the first post receiver.

5. The system of claim 4, wherein the first post receiver includes:

a third guide member mounted inside the receiver aperture proximate the top and the first longitudinal side of the first post receiver; and a fourth guide member mounted inside the receiver aperture proximate the top and the second longitudinal side of the first post receiver.

6. The system of claim 5, wherein the first post receiver includes:

a fifth guide member mounted inside the receiver aperture in a position spaced below the first guide member;

a sixth guide member mounted inside the receiver aperture in a position spaced below the second guide member;

a seventh guide member mounted inside the receiver aperture in a position spaced below the third guide member; and an eighth guide member mounted inside the receiver aperture in a position spaced below the guide member.

7. The system of claim 6, wherein the receiver aperture defines:

a first vertically extending channel proximate the first lateral side in which the first guide member and the fifth guide member are disposed;

a second vertically extending channel proximate the second lateral side in which the second guide member and the sixth guide member are disposed;

a third vertically extending channel proximate the first longitudinal side in which the third guide member and the seventh guide member are disposed; and a fourth vertically extending channel proximate the second longitudinal side in which the fourth guide member and the eighth guide member are disposed.

8. The system of claim 3, wherein the first guide member is a roller rotatably mounted to the first post receiver.

9. The system of claim 1, further comprising a locking device mounted to the cross member, where the locking device is configured to selectively restrict the system from moving between the closed configuration and the open configuration.

10. The system of claim 9, wherein the locking device includes:

a fixed member mounted to the cross member, the fixed member being configured to receive the front member and defining a port disposed above the front member when the front member is received in the fixed member; and a pin complementarily configured with the port and configured to selectively insert into the port to retain the front member within the fixed member.

11. The system of claim 1, wherein the second frame at the second elevation is vertically aligned with the first frame in the open configuration.

12. The system of claim 1, further comprising a bumper mounted to the first frame and configured to abut the second frame disposed above the first frame in the closed configuration.

13. The system of claim 1, further comprising a first support member leg coupled to the first frame and extending to a support surface on which the system is disposed.

14. The system of claim 1, further comprising a retainer mounted to the roller bar and configured to restrict the roller bar from axially translating relative to the first post.

15. The system of claim 14, wherein the retainer is complementarily configured with the first aperture of the first post to restrict the retainer from passing through the first aperture.

16. The system of claim 15, wherein the retainer extends radially from the roller bar to an extent sufficient for a combined radial dimension of the roller bar and the retainer to exceed a corresponding radial dimension of the first aperture.

17. The system of claim 14, wherein the retainer is a ring extending around the roller bar.

18. The system of claim 1, further comprising a stop member projecting from the first post and configured to engage the first post receiver to restrict the first post from lowering further into the first post receiver.

19. A system, comprising:

a first frame including:

a front end;

a rear end spaced from the front end; and a cross member extending from the front end to the rear end;

a second frame rotatably coupled to the first frame, the second frame including:

a front member proximate to the front end and extending transversely relative to the cross member; and a rear member proximate to the rear end and extending transversely relative to the cross member;

a vertically oriented first post with a first aperture located proximate to a proximal end of the first post;

a vertically oriented second post with a second aperture located proximate to a proximal end of the second post;

a first post receiver secured to the cross member proximate the front end, wherein the first post receiver is configured to slidably receive and retain the first post;

a second post receiver secured to the cross member proximate the rear end, wherein the second post receiver is configured to slidably receive and retain the second post;

a roller bar with a proximal end secured to the front member and with a distal end secured to the rear member;

a first solar cell panel supported by the first frame; and a second solar cell panel supported by the second frame wherein the roller bar is extended through the first aperture of the first post and is extended through the second aperture of the second post so that the second frame is rotatably coupled to the first frame.

\* \* \* \* \*